(12) United States Patent
Yoneda et al.

(10) Patent No.: US 10,962,970 B2
(45) Date of Patent: Mar. 30, 2021

(54) VEHICLE, VEHICLE CONTROL METHOD, VEHICLE REMOTE OPERATION APPARATUS, AND VEHICLE REMOTE OPERATION METHOD

(71) Applicant: Panasonic Intellectual Property Corporation of America, Torrance, CA (US)

(72) Inventors: Takahiro Yoneda, Osaka (JP); Shuhei Matsui, Osaka (JP); Yuta Shimotsuma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 75 days.

(21) Appl. No.: 16/247,689

(22) Filed: Jan. 15, 2019

(65) Prior Publication Data

US 2019/0146485 A1 May 16, 2019

Related U.S. Application Data

(63) Continuation of application No. PCT/JP2018/015326, filed on Apr. 12, 2018.

(30) Foreign Application Priority Data

Jun. 30, 2017 (JP) .............................. JP2017-128291
Mar. 20, 2018 (JP) .............................. JP2018-053107

(51) Int. Cl.
*G05D 1/00* (2006.01)
*B60W 30/14* (2006.01)
*G05D 1/02* (2020.01)

(52) U.S. Cl.
CPC ......... *G05D 1/0022* (2013.01); *B60W 30/146* (2013.01); *G05D 1/0011* (2013.01);
(Continued)

(58) Field of Classification Search
CPC .. G05D 1/0022; G05D 1/0011; G05D 1/0038; G05D 1/0223; G05D 2201/0213;
(Continued)

(56) References Cited

U.S. PATENT DOCUMENTS 7,124,014 B1    10/2006  Ishida et al.
2002/0056583 A1  5/2002  Takano et al.
(Continued)

FOREIGN PATENT DOCUMENTS

JP    7-009969    1/1995
JP    2000-104580  4/2000
(Continued)

OTHER PUBLICATIONS

English_Translation JP2011043883A (Year: 2011).*
(Continued)

*Primary Examiner* — Peter D Nolan
*Assistant Examiner* — Ashley L Redhead, Jr.
(74) *Attorney, Agent, or Firm* — Greenblum & Bernstein, P.L.C.

(57) ABSTRACT

A vehicle that is remotely operable by an operator is provided. The vehicle includes a communication circuit that receives a vehicle operation signal including an accelerator input value based on a first operation performed by the operator, a steering angle sensor that measures a steering angle of the vehicle, a speed sensor that measures a speed of the vehicle, and a processor. The processor corrects the accelerator input value such that when the absolute value of an angular measure of the steering angle is greater than or equal to a predetermined angular measure and the speed is greater than zero, the accelerator input value is corrected so as to reduce the speed to a value that is less than when the
(Continued)

absolute value of the angular measure of the steering angle is less than the first predetermined angular measure and the speed is greater than zero.

10 Claims, 12 Drawing Sheets

(52) U.S. Cl.
CPC ......... *G05D 1/0038* (2013.01); *G05D 1/0223* (2013.01); *B60W 2540/10* (2013.01); *B60W 2540/18* (2013.01); *G05D 2201/0213* (2013.01)

(58) Field of Classification Search
CPC .. G05D 1/00; B60W 30/146; B60W 2540/18; B60W 2540/10; B60W 2556/45; B60W 50/038; F02D 11/10; F02D 29/02; H04Q 9/00

See application file for complete search history.

(56) References Cited

U.S. PATENT DOCUMENTS

| | | |
|---|---|---|
| 2002/0134350 A1 | 9/2002 | Takano et al. |
| 2003/0034192 A1 | 2/2003 | Takano et al. |
| 2006/0235602 A1 | 10/2006 | Ishida et al. |
| 2009/0180668 A1* | 7/2009 | Jones ................ H04N 7/185 382/103 |
| 2017/0108871 A1* | 4/2017 | Watts ................ G05D 1/0044 |
| 2017/0123429 A1 | 5/2017 | Levinson et al. |

FOREIGN PATENT DOCUMENTS

| | | |
|---|---|---|
| JP | 2006-299856 | 11/2006 |
| JP | 2011-043883 | 3/2011 |
| JP | 2011-043884 | 3/2011 |
| JP | 2011043883 A * | 3/2011 |

OTHER PUBLICATIONS

International Search Report of PCT application No. PCT/JP2018/015326 dated Jul. 17, 2018.
The Extended European Search Report dated Apr. 17, 2020 for corresponding EPO Application No. 18823101.3.
Communication pursuant to Article 94(3) EPC dated Nov. 12, 2020 for the related European Patent Application No. 18823101.3.

\* cited by examiner

VEHICLE, VEHICLE CONTROL METHOD, VEHICLE REMOTE OPERATION APPARATUS, AND VEHICLE REMOTE OPERATION METHOD

BACKGROUND

1. Technical Field

The present disclosure relates to a vehicle remotely operated by an operator, a vehicle control method for controlling the vehicle, a vehicle remote operation apparatus that remotely operates a vehicle, and a vehicle remote operation method of the vehicle remote operation apparatus.

2. Description of the Related Art

There is a remote operation system in which a vehicle in which no driver exists or a vehicle that is not operated by a driver is indirectly driven or steered by an operator at a remote location.

In such a remote operation system, a situation around a vehicle is observed using various sensors installed on the vehicle, such as a millimeter-wave radar, a laser radar, a camera, or the like, and a resultant sensed result is transmitted via communication means from the vehicle (hereinafter referred to as the vehicle under control) to the operator, and a control signal for controlling running of the vehicle is transmitted from the operator to the vehicle under control whereby the operator steers the vehicle under control from a remote location.

For example, Japanese Unexamined Patent Application Publication No. 7-009969 discloses a technique in which when a steerer issues an instruction from a transmitter to specify a speed, a steering direction, or the like of an unmanned vehicle, the unmanned vehicle starts steering after reducing the vehicle speed to the specified. When the steering is ended, the reduced vehicle speed is returned to the original vehicle speed.

SUMMARY

However, a further improvement is needed in the remote operation system in which a vehicle under control is steered by an operator at a remote location using a wireless communication such as a wireless LAN, portable telephone line, or the like.

In one general aspect, the techniques disclosed here feature a vehicle that is remotely operable by an operator, including a communication circuit that receives a vehicle operation signal including an accelerator input value input based on a first operation performed by the operator, a steering angle sensor that measures a steering angle of the vehicle, a speed sensor that measures a speed of the vehicle, and a processor that, during vehicle operation, performs operations including, when an absolute value of an angular measure of the steering angle is greater than or equal to a first predetermined angular measure and the speed is greater than zero, correcting the accelerator input value so as to reduce the speed to a value that is less than when the absolute value of the angular measure of the steering angle is less than the particular angle and the speed is greater than 0.

According to the present disclosure, it is possible to improve operability in remotely operating a vehicle.

It should be noted that general or specific embodiments may be implemented as a system, a method, an integrated circuit, a computer program, a storage medium, or any selective combination thereof.

Additional benefits and advantages of the present disclosure will become apparent from the specification and drawings. The benefits and advantages may be individually obtained by the various embodiments and features of the specification and drawings. However, it does not necessarily need to provide all such benefits and advantages.

DETAILED DESCRIPTION

First, underlying knowledge forming basis of the present disclosure is described below.

Figure 13:
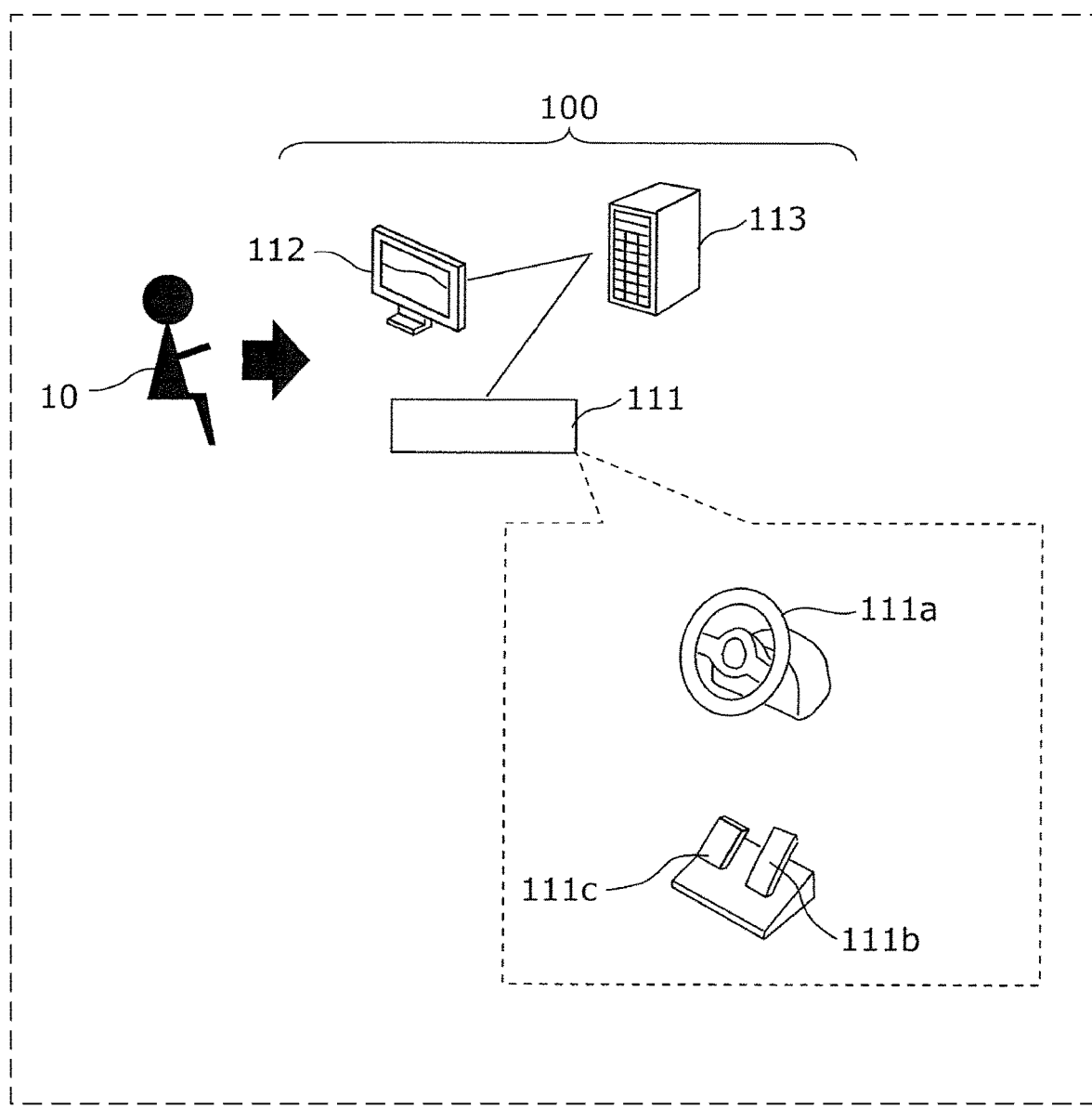
FIG. 13 is a diagram illustrating a conventional remote operation apparatus.

FIG. 13 is a diagram illustrating a conventional remote operation apparatus. In FIG. 13, a vehicle remote operation apparatus 100 (hereinafter, referred to as the remote operation apparatus 100) includes a remote operation unit 113, an information display unit 112, and an operation input unit 111.

The remote operation unit 113 is connected to a vehicle under control via a communication network. The remote operation unit 113 receives, from the vehicle under control, image information representing an image around the vehicle under control, information indicating a speed of the vehicle under control, and/or the like, and the remote operation unit 113 outputs the received information to an information display unit 112.

The operation input unit 111 includes a steering input unit 111a for steering the vehicle under control, an accelerator input part 111b for changing a rotation speed of an engine of the vehicle under control, and a brake input part 111c for controlling a brake of the vehicle under control.

An operator 10, who remotely steers the vehicle under control, operates the operation input unit 111 based on information provided via the information display unit 112. A signal is generated as a result of operating the operation input unit 111 by the operator 10 (hereinafter, this signal will be referred to as the vehicle operation signal) and is transmitted to the vehicle under control from the remote operation unit 113 via a communication network.

The vehicle under control is steered based on the received vehicle operation signal.

In a situation in which the operator 10 located at a remote place steers the vehicle under control using the remote operation apparatus 100, there are two problems.

A first problem is described below.

Because the operator 10 is not on the vehicle under control, the operator 10 cannot directly feel a change in an increase in speed, an increase in the engine rotation speed, or the like, that occurs in the vehicle under control in response to the operation on the accelerator input part 111b by the operator 10. That is, the operator 10 cannot directly feel a change occurring in the vehicle under control in response to the operation by the operation input unit 111, which would be directly felt by a driver who is on the vehicle. Therefore, the operator 10 cannot adjust the steering or the speed via the operation input unit 111 in response to direct feeling of a danger or based on knowledge obtained via experiences.

In a situation in which the operator 10 steers the vehicle under control using only the image information representing the image around the vehicle under control displayed on the information display unit 112 and the visual information on the speed of the vehicle under control, the operator 10 has to carefully operate the steering input unit 111a and the accelerator input part 111b of the operation input unit 111 and/or the brake input part 111c of the accelerator input part 111b.

However, in a case where a large and/or abrupt change occurs in the image information representing the image around the vehicle under control displayed on the information display unit 112, the operator 10 may focus too much on the information display unit 112, which may cause a reduction in concentration on the steering of the vehicle under control via the operation input unit 111. As a result, the operator 10 may operate the operation input unit 111 by too great an amount, which may cause the vehicle under control to have an abrupt acceleration or deceleration, which may result in a problem in steering the vehicle under control.

A result of an experiment of steering a vehicle under control using the remote operation apparatus 100 is described below with reference to FIG. 14 and FIG. 15. More specifically, in the experiment described below, the operator 10 operates the vehicle under control using the remote operation apparatus 100 such that the vehicle under control was first driven straight, stopped once, and then turned right. Note that in a case where turning-left was performed, a similar experimental result was obtained to that obtained when turning-right was performed.

Figure 14:
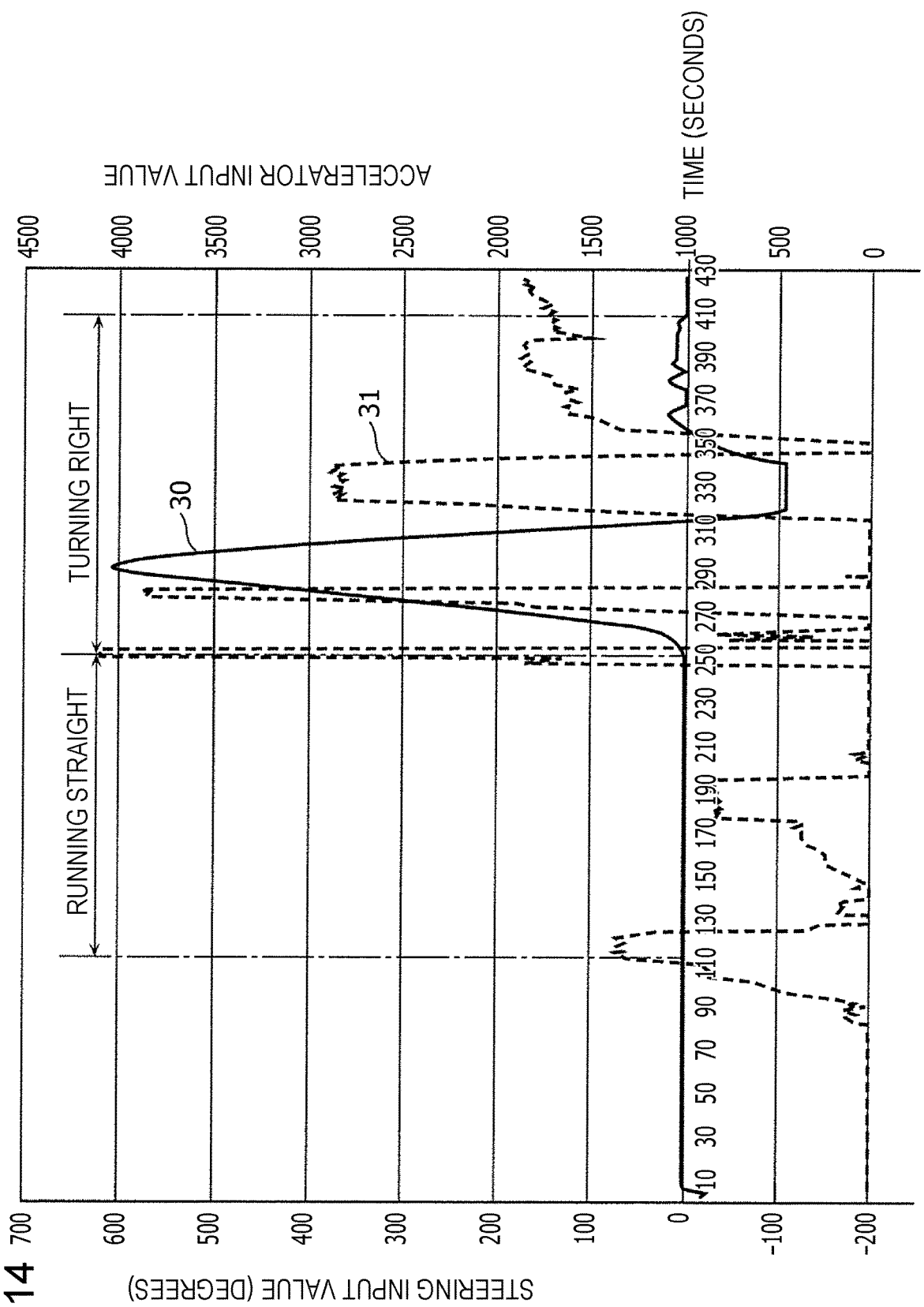
FIG. 14 is a graph illustrating a problem in a conventional remote operation apparatus.
Figure 15:
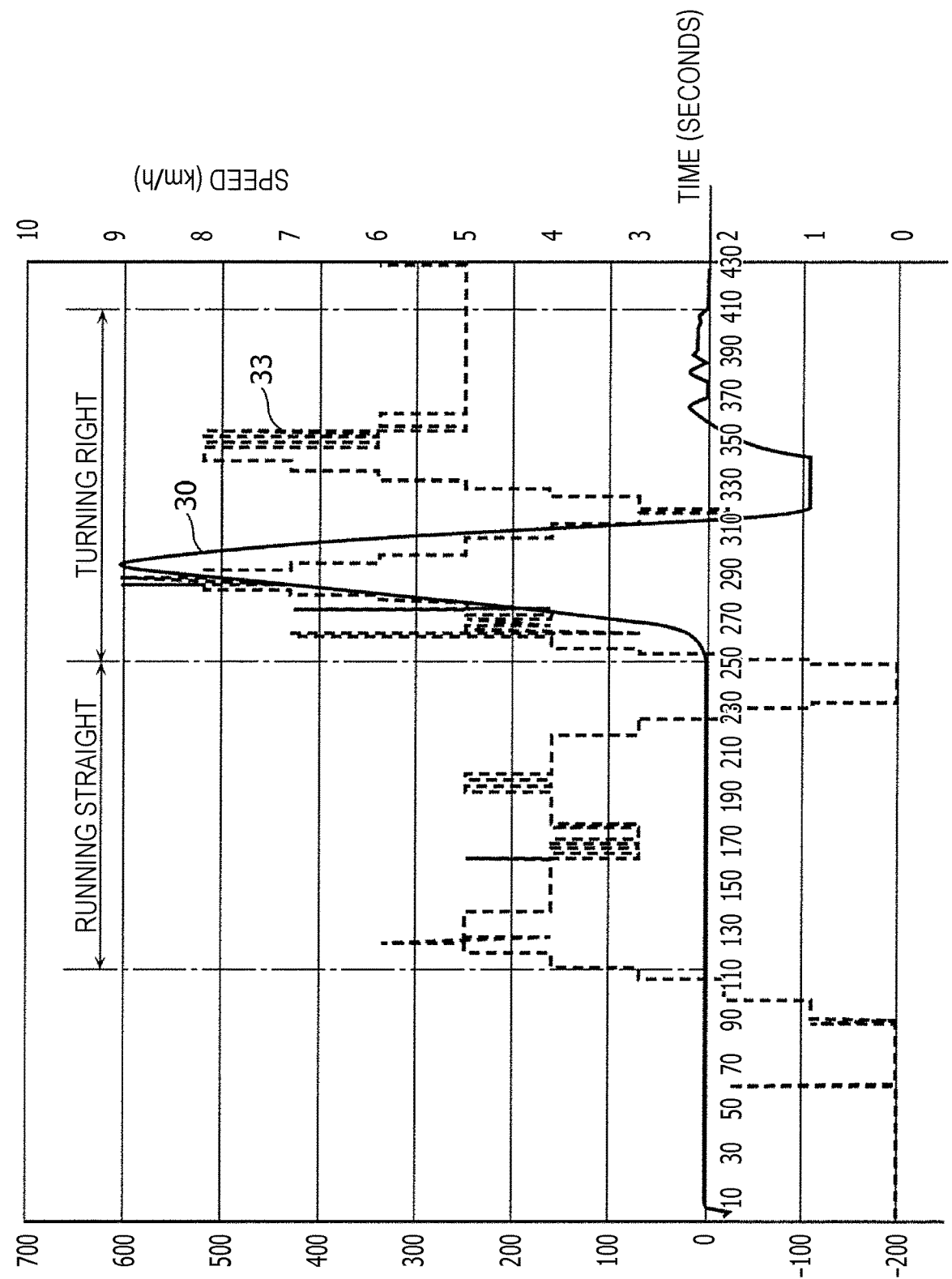
FIG. 15 is another graph illustrating a problem in a conventional remote operation apparatus.

FIG. 14 and FIG. 15 are graphs illustrating a problem in a conventional remote operation apparatus. FIG. 14 is a graph in which a steering input value and an accelerator input value in an operation of steering a vehicle under control are plotted as a function of time. FIG. 15 is a graph in which a steering input value and a speed in an operation of steering a vehicle under control are plotted as a function of time.

In FIG. 14, a horizontal axis represents time (seconds), a vertical axis on a left-hand side represents the steering input value (degrees), and a vertical axis on a right-hand side represents the accelerator input value. In FIG. 14, an input value 30 (a solid line in the figure) applied to the steering input unit 111a and an input value 31 (a broken line in the figure) applied to the accelerator input part 111b are plotted. In FIG. 15, a horizontal axis represents time (in seconds), a vertical axis on a left-hand side represents the steering input value, and a vertical axis on a right-hand side represents a speed (km/h). In FIG. 15, an input value 30 (a solid line in the figure) applied to the steering input unit 111a and a speed 33 (a broken line in the figure) of the vehicle under control are plotted.

In FIG. 14 and FIG. 15, in a period from time 110 to time 250 and in a period after time 410 as represented in seconds in the horizontal axis, the vehicle under control ran straight, while in a period from time 250 to time 410 as represented in seconds in the horizontal axis, the vehicle under control turned right. That is, the operator 10 performed a go-straight operation on the steering input unit 111a, and then the operator 10 performed a stop operation on the accelerator input part 111b and an operation on the brake input part 111c. After that, the operator 10 started a turn-right operation on the steering input unit 111a. An abrupt change in the accelerator input value occurred when the turn-right operation was performed on the accelerator input part 111b. As a result, an abrupt acceleration or deceleration was imposed on the vehicle under control unlike a situation in which the vehicle under control ran straight.

In a case where a turn-right operation is performed by a driver who is actually on a vehicle, the driver generally adjusts the speed of the vehicle depending on an acceleration or a rotation that the driver directly feels while visually watching the situation around the vehicle rather without watching a speedometer to check the vehicle speed.

However, in the case where the operator 10 performs an operation to turn right or turn left the vehicle under control using the remote operation apparatus 100, the operator 10 has to operate simultaneously both the steering input unit 111a and the accelerator input part 111b of the operation input unit 111 while visually checking not only the image information representing an image around the vehicle under control displayed on the information display unit 112 but also the vehicle speed of the vehicle under control, and thus the operation performed by the operator 10 is difficult.

Furthermore, in a period in which the vehicle under control is turning right or left, the image information on the image around the vehicle under control displayed on the information display unit 112 scrolls in a horizontal direction. This makes it more difficult, than in a case where the vehicle under control runs straight, for the operator 10 to recognize the speed, the acceleration, and the rotation speed (for example, an angular velocity of the vehicle under control) of the vehicle under control.

As a result, the operation on the accelerator input part 111b by the operator 10 becomes rough, which causes the vehicle under control to have an abrupt acceleration or deceleration in the turning-right operation.

Next, a second problem is described below.

When a change occurs in a condition around the vehicle under control, the operator 10, who is not on the vehicle under control, may have a large delay in recognizing the change in the condition around the vehicle under control compared with a driver who is on a vehicle and drives the vehicle. This can cause a delay to also occur in steering the vehicle under control.

The delay can include a delay due a process of encoding an input signal provided from a camera installed on the vehicle under control, a delay due to a transmission of the encoded video information to the remote operation unit 113 via a communication network, a delay due to a process performed by the remote operation unit 113 to decode the received image information and output the decoded image information to the information display unit 112, a delay due to a process performed by the remote operation unit 113 to generate a vehicle operation signal based on a result of an operation performed on the operation input unit 111 by the operator 10, and a delay due to a transmission of the vehicle operation signal to the vehicle under control via the communication network. That is, the delay includes a delay component due to communication depending on congestion of a network, and a delay component due to processing performed by a device or the like, and the delays change dynamically. The time period from the occurrence of a change in a condition around the vehicle under control till the operation performed on the vehicle under control is increased by an amount corresponding to the delay described above, and thus a corresponding delay occurs in the steering of the vehicle under control.

In a case where there is a large delay time from an occurrence of a change in a condition around the vehicle under control till an action in steering of the vehicle under control, when a bicycle suddenly appears in front of the vehicle under control, for example, at an intersection or a curve with poor visibility, a delay occurs in reaction of the operator 10 at a remote location and a delay occurs in an operation on the vehicle under control to avoid a collision.

In view of the above, the present inventors have performed an investigation to find a solution to suppress an abrupt acceleration in a turn-right/left operation or the like, and the present inventors have found that the first problem described above can be solved by correcting an accelerator input value acquired during a turn-right/left operation.

More specifically, in an aspect, the present disclosure provides a vehicle that is remotely operable by an operator, including a communication circuit that receives a vehicle operation signal including an accelerator input value input based on a first operation performed by the operator, a steering angle sensor that measures a steering angle of the vehicle, a speed sensor that measures a speed of the vehicle, and a processor that, during vehicle operation, performs processing operations including, when an absolute value of an angular measure of the steering angle is greater than or equal to a a first predetermined angular measure and the speed is greater than zero, correcting the accelerator input value so as to reduce the speed to a value that is less than when the absolute value of the angular measure of the steering angle is less than the first predetermined angular measure and the speed is greater than zero.

In this aspect, even in a situation in which the operator, who remotely operates the vehicle, cannot directly feel the acceleration or the rotation of the vehicle, a reduction in the speed of the vehicle results in a reduction in a load related to the operation of the accelerator or the brake by the operator. This makes it possible for the operator, in the remote operation of the vehicle under control, to focus on the steering operation depending on the image information representing the condition around the vehicle received from the vehicle. That is, it is possible to provide a vehicle with improved operability.

The present inventors also have found that the second problem described above can be solved by changing the correction of the accelerator input value depending on the delay time. More specifically, in the correcting, the accelerator input value may be corrected based on a delay time from a time that the first operation is performed by the operator to a time of the reception of the vehicle operation signal by the communication circuit.

In this aspect, it is possible to adjust the speed of the vehicle in a speed range depending on an increase or reduction in the delay time.

Thus, even in a case where a temporary increase occurs in the delay time, the operator is allowed to operate the vehicle without being conscious of the increase in the delay time. That is, it is possible to provide a vehicle with a further improved operability.

In the vehicle, the accelerator input value may be corrected such that when the absolute value of the angular measure of the steering angle is greater than or equal to the first predetermined angular measure and the speed is greater than zero, the accelerator input value is corrected so as to increase a rate at which the speed is reduced as the delay time increases.

Furthermore, in the vehicle described above, the processing operations may further include changing the first predetermined angular measure based on a change in the delay time.

Furthermore, in the vehicle described above, the processing operations may further include reducing the first predetermined angular measure as the delay time increases.

In an aspect, the present disclosure provides a vehicle control method for controlling a vehicle that is remotely operable by an operator, including receiving a vehicle operation signal including an accelerator input value input based on a first operation performed by the operator, and when an absolute value of an angular measure of a steering angle of the vehicle is greater than or equal to a first predetermined angular measure and a speed of the vehicle is greater than zero, correcting the accelerator input value such that the speed is reduced to a value that is less than when the absolute value of the angular measure of the steering angle is less than the first predetermined angular measure and the speed is greater than zero.

In an aspect, the present disclosure provides a vehicle remote operation apparatus that is usable by an operator to remotely operate a vehicle, including an accelerator controller that outputs an accelerator input value for controlling a speed of the vehicle based on a first operation performed by the operator, a communication circuit that receives a signal that includes information relating to the speed of the vehicle, and a processor that, during vehicle operation, performs processing operations including when an absolute value of an angular measure of a steering angle of the vehicle is greater than or equal to a first predetermined angular measure and the speed is greater than zero, correcting the accelerator input value so as to reduce the speed to a value that is less than when the absolute value of the angular measure of the steering angle is less than the first predetermined angular measure and the speed is greater than zero.

In an aspect, the present disclosure provides a vehicle remote operation method for remotely operating a vehicle by an operator, including acquiring an accelerator input value, which relates to controlling a speed of the vehicle, based on a first operation performed by the operator, receiving information that relates to the speed of the vehicle, and when an absolute value of an angular measure of a steering angle of the vehicle is greater than or equal to a first predetermined angular measure and the speed is greater than zero, correcting the accelerator input value so as to reduce the speed to a value that is less than when the absolute value of the angular measure of the steering angle is less than the first predetermined angular measure and the speed is greater than zero.

General or specific embodiments may be implemented as a system, a method, an integrated circuit, a computer program, a computer-readable non-temporary record medium such as a CD-ROM disk, or any selective combination of a system, a method, an integrated circuit, a computer program, and a storage medium. The program may be stored in advance in a storage medium or may be supplied to a storage medium via a wide area network including the Internet or the like.

Embodiments are described in detail below with reference to drawings.

Note that any embodiment described below is provided to illustrate a general or specific example. In the following embodiments, values, shapes, materials, constituent elements, locations of elements, manners of connecting elements, steps, the order of steps, and the like are described by way of example but not limitation. Among constituent elements described in the following embodiments, those constituent elements that are not described in independent claims indicating highest-level concepts of the present disclosure are optional. Note that each drawing is a schematic diagram, which does not necessarily provide a strict description.

First Embodiment 1-1. Configuration of Remote Operation System

Figure 1:
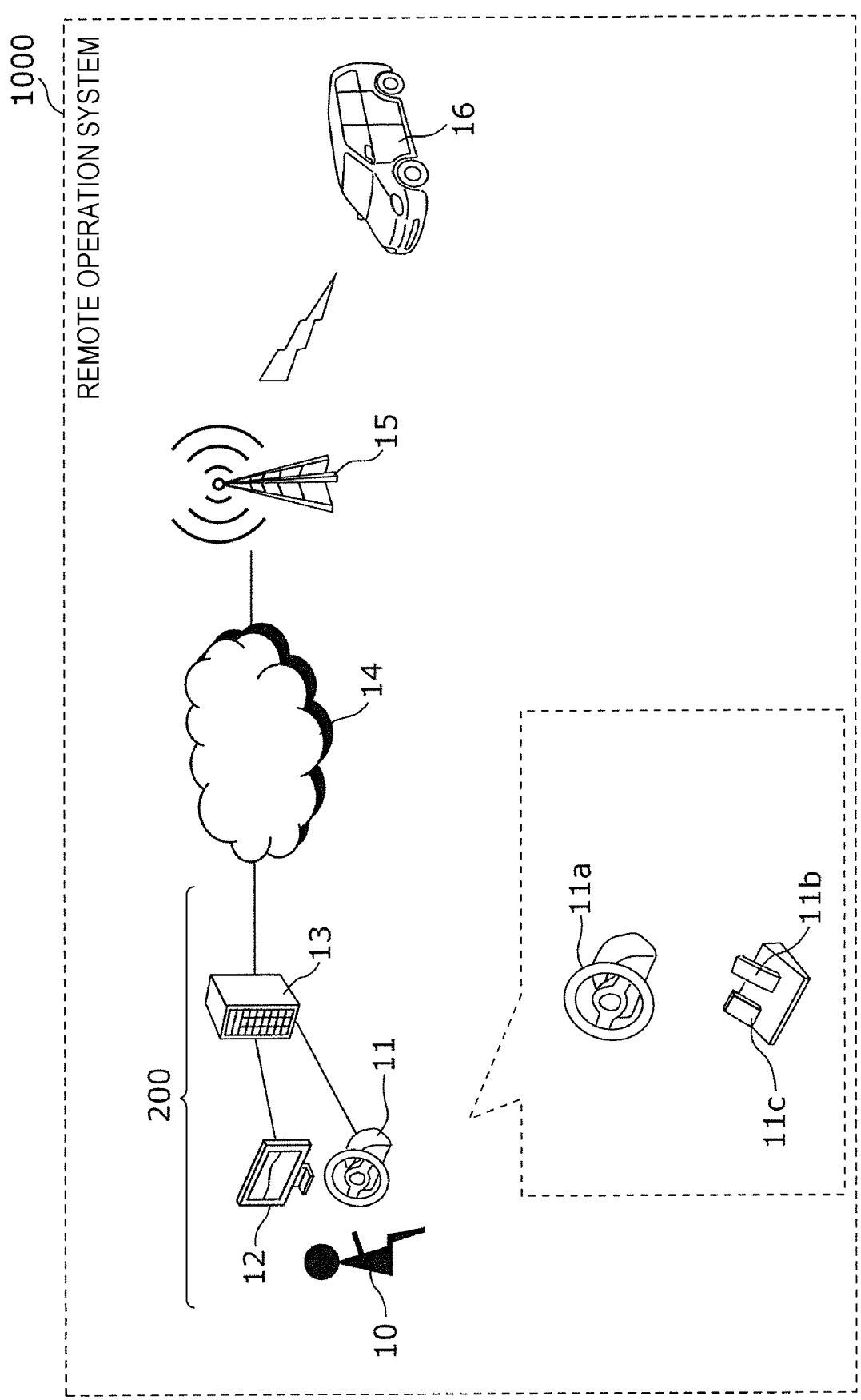
FIG. 1 is a diagram illustrating an example of a remote operation system according to a first embodiment.

FIG. 1 is a diagram illustrating an example of a remote operation system according to a first embodiment. In a remote operation system 1000, an operator 10 steers a vehicle 16 under control from a remote place. The vehicle 16 under control is connected to a vehicle remote operation apparatus 200 (hereinafter, referred to as a remote operation apparatus 200) via a radio base station 15 such as a wireless LAN, a portable telephone, or the like and a network 14. The remote operation apparatus 200 includes a remote operation unit 13, an information display unit 12, and an operation input unit 11 for steering the vehicle 16 under control. Note that the remote operation apparatus 200 may include not only a single information display unit 12 but a plurality of information display units 12. Note that the vehicle 16 under control is an example of a vehicle remotely operated by the operator 10.

The remote operation unit 13 outputs, to the information display unit 12, video information representing an image around the vehicle 16 under control and a speed of the vehicle 16 under control, transmitted from the vehicle 16 under control. The operation input unit 11 includes at least a steering input unit 11a for controlling the steering of the vehicle 16 under control, an accelerator input part 11b for controlling the rotation speed of an engine or a motor of the vehicle 16 under control, and a brake input part 11c for controlling a brake of the vehicle 16 under control. The speed of the vehicle 16 under control is controlled by the accelerator input part 11b and the brake input part 11c. For example, the steering input unit 11a is a steering wheel, the accelerator input part 11b is an accelerator pedal, and the brake input part 11c is a brake pedal.

The steering input unit 11a outputs, in response to an operation performed by the operator 10, a steering input value for controlling the steering of the vehicle 16 under control to a vehicle operation signal generation unit 1303. The accelerator input part 11b outputs, in response to an operation performed by the operator 10, an accelerator input value for controlling the speed of the vehicle 16 under control to the vehicle operation signal generation unit 1303.

In FIG. 1, the accelerator input part 11b or the brake input part 11c is of a pedal type that is operated by the operator 10 with his/her foot. However, the type thereof is not limited to this example. For example, the accelerator input part 11b or the brake input part 11c may be of a lever type that is operated by the operator 10 with his/her hand. Alternatively, the accelerator input part 11b or the brake input part 11c may be of a type in which a target speed is input. The steering input unit 11a is a steering wheel that is operated by the operator 10 with his/her hands. However, the steering input unit 11a is not limited to this type. For example, the steering input unit 11a may be of a type in which a target steering angle is input.

The operator 10, who remotely steers the vehicle 16 under control, operates the operation input unit 11 based on information provided via the information display unit 12. A signal is generated as a result of operating the operation input unit 11 by the operator 10, and the resultant signal is transmitted as the vehicle operation signal to the vehicle 16 under control from the remote operation unit 13 via the network 14 and the radio base station 15. The vehicle 16 under control is steered based on the received vehicle operation signal.

The vehicle operation signal includes at least an accelerator input value which is a signal generated when the operator 10 operates the accelerator input part 11b or the brake input part 11c. The vehicle operation signal may further include a steering input value which is a signal generated when the operator 10 operates the steering input unit 11a. The vehicle operation signal may include information indicating a time at which the operation input unit 11 is operated by the operator 10.

1-1-1. Configuration of Vehicle Under Control

A configuration of the vehicle 16 under control is described below with reference to FIG. 2.

Figure 2:
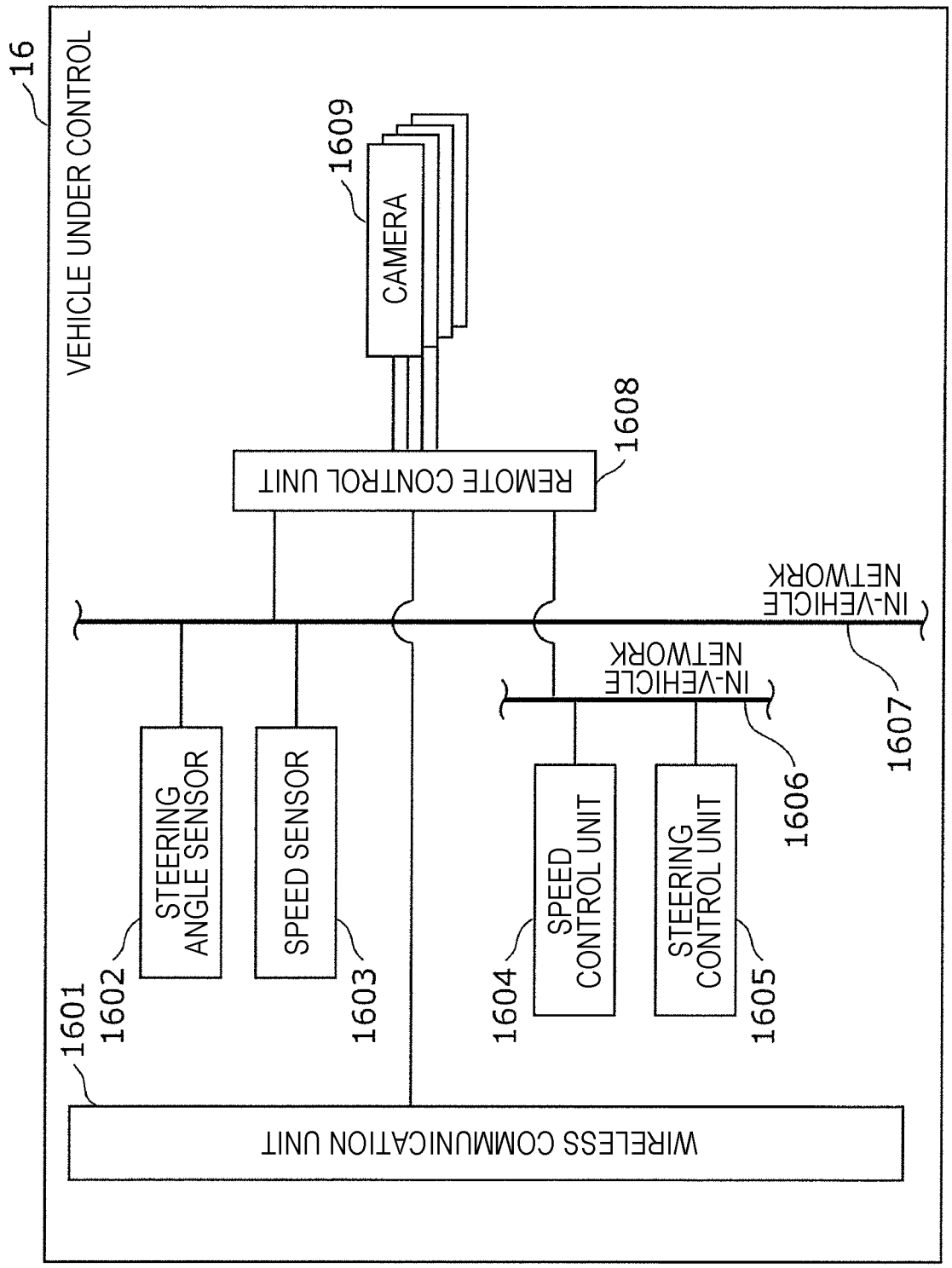
FIG. 2 is a block diagram illustrating an example of a configuration of a vehicle under control in a remote operation system according to a first embodiment.

FIG. 2 is a block diagram illustrating an example of a configuration of the vehicle 16 under control in the remote operation system 1000 according to the present embodiment. In FIG. 2, the vehicle 16 under control includes at least a wireless communication unit 1601, a steering angle sensor 1602, a speed sensor 1603, a speed control unit 1604, a steering control unit 1605, in-vehicle networks 1606 and 1607, a remote control unit 1608, and one or more cameras 1609. Note that FIG. 2 illustrates an example of a configuration of elements, in the vehicle 16 under control, relating to the remote operation.

The wireless communication unit 1601 wirelessly communicates with the radio base station 15. Note that the wireless communication unit 1601 is a radio communication module that receives a vehicle operation signal including at least an accelerator input value, and this wireless communication unit 1601 is an example of a communication part.

The steering angle sensor 1602 measures a steering angle of the vehicle 16 under control and outputs information associated with the steering angle over the in-vehicle network 1607.

The speed sensor 1603 measures a speed of the vehicle 16 under control and outputs information associated with the speed over the in-vehicle network 1607.

The speed control unit 1604 controls the speed by operating the accelerator, the brake, and the drive shift of the vehicle 16 under control.

The steering control unit 1605 controls a running direction of the vehicle by performing a steering operation on the vehicle 16 under control.

The in-vehicle networks 1606 and 1607 are in-vehicle networks such as CAN (Control Area Network) or the like, and they transmit information among sensors and units installed on the vehicle 16 under control. That is, the sensors and the units installed on the vehicle 16 under control are connected to each other via the in-vehicle networks 1606 and 1607 such that they are allowed to communicate with each other. The in-vehicle networks 1606 and 1607 may be integrated into one in-vehicle network or may be further divided.

The one or more cameras 1609 are disposed such that an image can be captured from the vehicle 16 under control at least in one of directions including a forward direction (for example, a running direction), a backward direction, a leftward direction, and a rightward direction, thereby acquiring an image around the vehicle 16 under control.

The remote control unit 1608 acquires information output from the steering angle sensor 1602 and the speed sensor 1603 via the in-vehicle network 1607.

The remote control unit 1608 generates image information representing images in the forward, backward, leftward, and rightward directions seen from the vehicle 16 under control, based on information provided by the one or more cameras 1609. The remote control unit 1608 then transmits the generated image information to the remote operation apparatus 200 via the wireless communication unit 1601.

The remote control unit 1608 receives the vehicle operation signal transmitted from the remote operation apparatus 200 via the wireless communication unit 1601.

Based on the received vehicle operation signal, the remote control unit 1608 controls running of the vehicle 16 under control via the speed control unit 1604 and the steering control unit 1605. In this process, the remote control unit 1608 corrects the accelerator input value included in the vehicle operation signal received from the remote operation apparatus 200 based on, at least, the vehicle information of the vehicle 16 under control acquired from the steering angle sensor 1602 and the speed sensor 1603, and the remote control unit 1608 outputs the resultant corrected accelerator input value to the speed control unit 1604. Note that the remote control unit 1608 is a control apparatus installed on the vehicle 16 under control and is an example of a controller that corrects the accelerator input value.

1-1-2. Configuration of Remote Operation Unit of Remote Operation Apparatus

Next, a configuration of the remote operation unit 13 of the remote operation apparatus 200 is described below with reference to FIG. 3.

Figure 3:
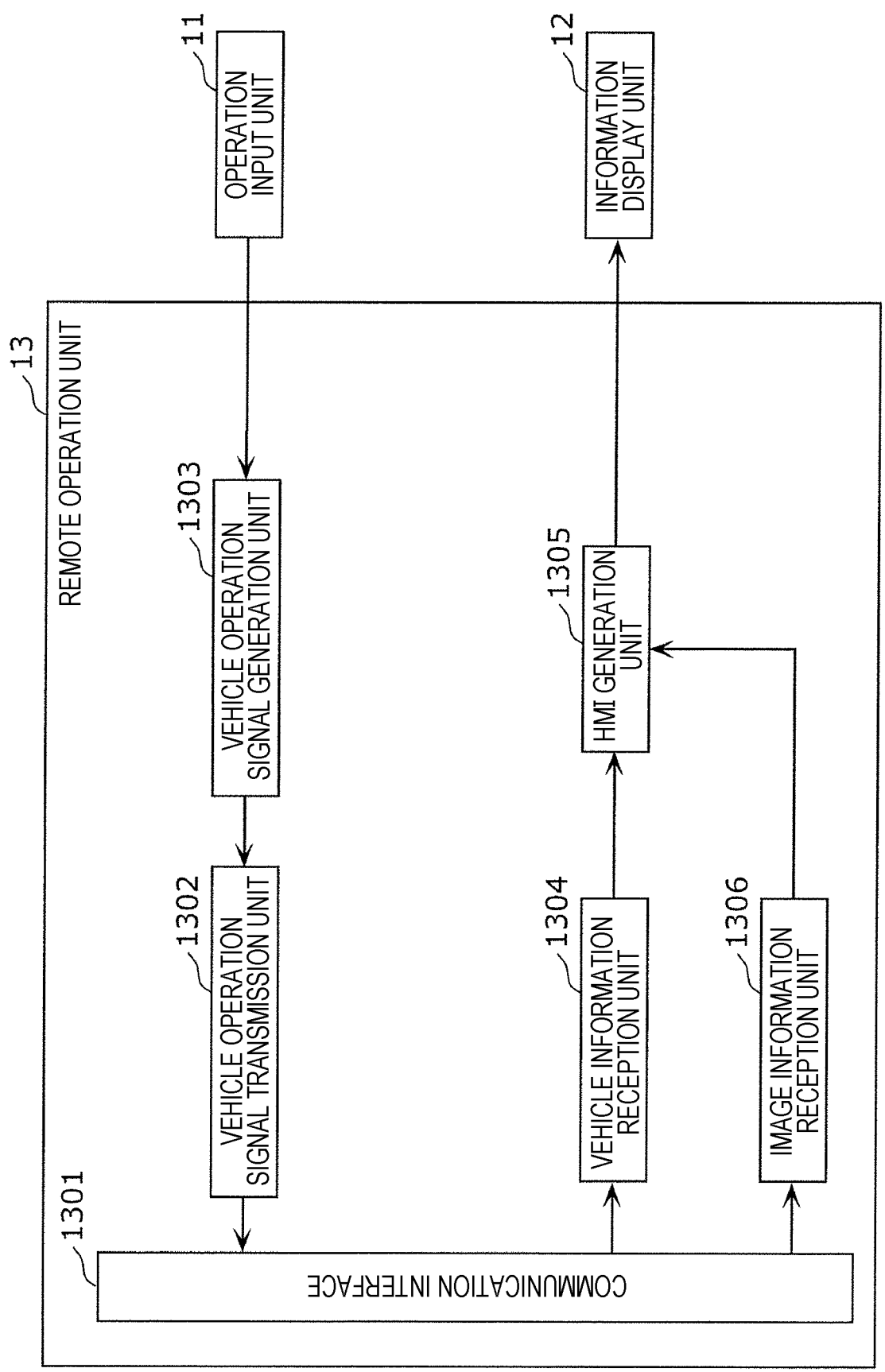
FIG. 3 is a block diagram illustrating an example of a configuration of a remote operation apparatus in a remote operation system according to the first embodiment.

FIG. 3 is a block diagram illustrating an example of a configuration of the remote operation unit 13 of the remote operation apparatus 200 in the remote operation system 1000 according to the present embodiment. In FIG. 3, the remote operation unit 13 includes, at least, a communication interface 1301, a vehicle operation signal transmission unit 1302, a vehicle operation signal generation unit 1303, a vehicle information reception unit 1304, an HMI (Human Machine Interface) generation unit 1305, and an image information reception unit 1306.

The communication interface 1301 is connected to the network 14 and communicates with the vehicle 16 under control. Note that the wireless communication unit 1601 is a radio communication module for communicating with the vehicle 16 under control and is an example of a communication part included in the remote operation apparatus 200.

The vehicle operation signal generation unit 1303 generates a vehicle operation signal based on an operation performed on the operation input unit 11 by the operator 10.

The vehicle operation signal transmission unit 1302 transmits the vehicle operation signal generated by the vehicle operation signal generation unit 1303 to the vehicle 16 under control via the communication interface 1301.

The vehicle information reception unit 1304 receives at least the vehicle information transmitted by the vehicle 16 under control via the communication interface 1301.

The image information reception unit 1306 receives the image information transmitted by the vehicle 16 under control via the communication interface 1301.

Based on the received vehicle information and image information, the HMI generation unit 1305 generates information necessary in the operation of the vehicle 16 under control by the operator 10, and the HMI generation unit 1305 outputs the generated information to the information display unit 12.

1-2. Operation in Vehicle Under Control

Next, an operation (a process) in the vehicle 16 under control is described below with reference to FIG. 4.

Figure 4:
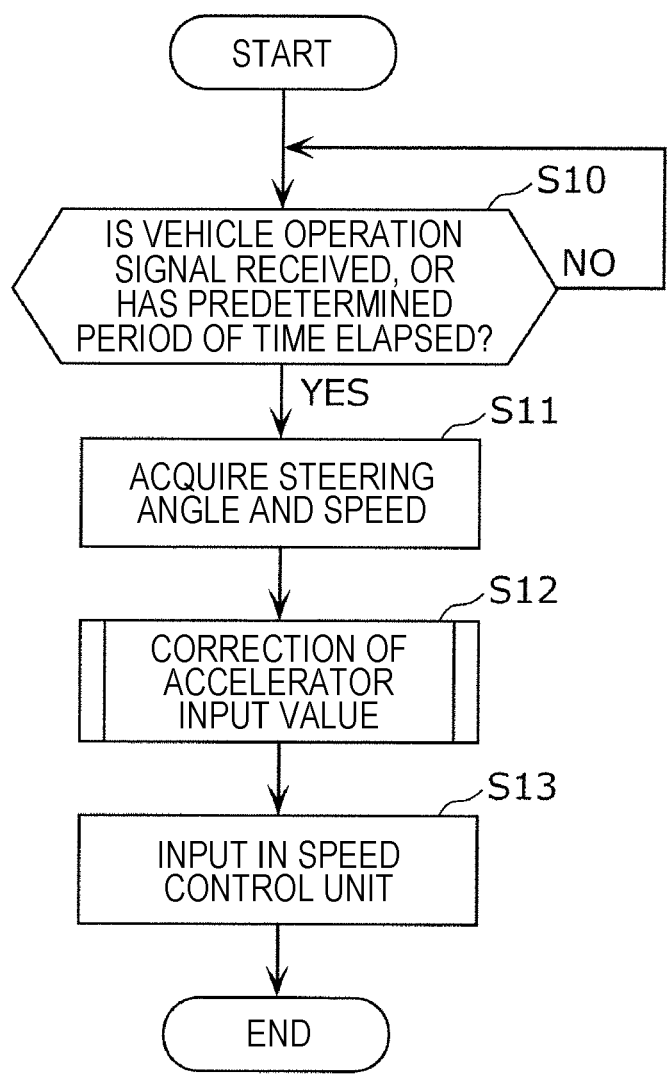
FIG. 4 is a flow chart illustrating an example of a process, performed in a remote control unit, on a vehicle operation signal received from a remote operation apparatus according to the first embodiment.

FIG. 4 is a flow chart illustrating an example of a process, performed in the remote control unit 1608, on the vehicle operation signal received from the remote operation apparatus 200 according to the present embodiment.

The remote control unit 1608 performs the process described in the flow chart in FIG. 4 repeatedly as long as the operation on the remote operation apparatus 200 by the operator 10 continues.

In FIG. 4, in a case where the remote control unit 1608 receives a vehicle operation signal from the remote operation unit 13 of the remote operation apparatus 200 or in a case where a fixed time has elapsed since a previous reception of a vehicle operation signal (in a case where YES in S10), the remote control unit 1608 acquires a steering angle of the vehicle 16 under control from the steering angle sensor 1602 and acquires a speed of the vehicle 16 under control from the speed sensor 1603 (S11). Note that there is no particular restriction on the fixed time. For example, the fixed time may be 500 ms, 1 s, or the like. In a case where in step S10, the fixed time has elapsed from a previous reception of a vehicle operation signal, the remote control unit 1608 performs a process described below using the previously received vehicle operation signal. Note that also this case is regarded as a case in which a vehicle operation signal has been received. Also note that step S10 is an example of a step of receiving a vehicle operation signal.

On the other hand, in a case where the remote control unit 1608 has not received a vehicle operation signal from the remote operation unit 13 of the remote operation apparatus 200, or in a case where the fixed time has not yet elapsed since the previous reception of a vehicle operation signal (in a case where NO in step S10), the processing flow returns to step S10.

Next, the remote control unit 1608 corrects the accelerator input value included in the vehicle operation signal received in step S10 or the accelerator input value included in the previously received vehicle operation signal, based on the steering angle and the speed acquired in step S11 (step S12). Note that step S12 is an example of a step of correcting the accelerator input value.

The remote control unit 1608 inputs the resultant corrected accelerator input value to the speed control unit 1604 (step S13).

Next, a process of correcting the accelerator input value in step S12 is described below with reference to FIG. 5 to FIG. 8. The present embodiment has a feature that the correction of the accelerator input value or the like included in the vehicle operation signal received in step S10 is performed differently depending on the steering angle and the speed acquired in step S11. The remote control unit 1608 performs the correction, for example, such that when the operator 10 remotely operates the vehicle 16 under control in a situation in which the operator 10 is not on the vehicle 16 under control and thus the operator 10 cannot get information via feeling which would be obtained on site, the correction allows the operator 10 to drive the vehicle 16 under control in a safer manner.

Figure 5:
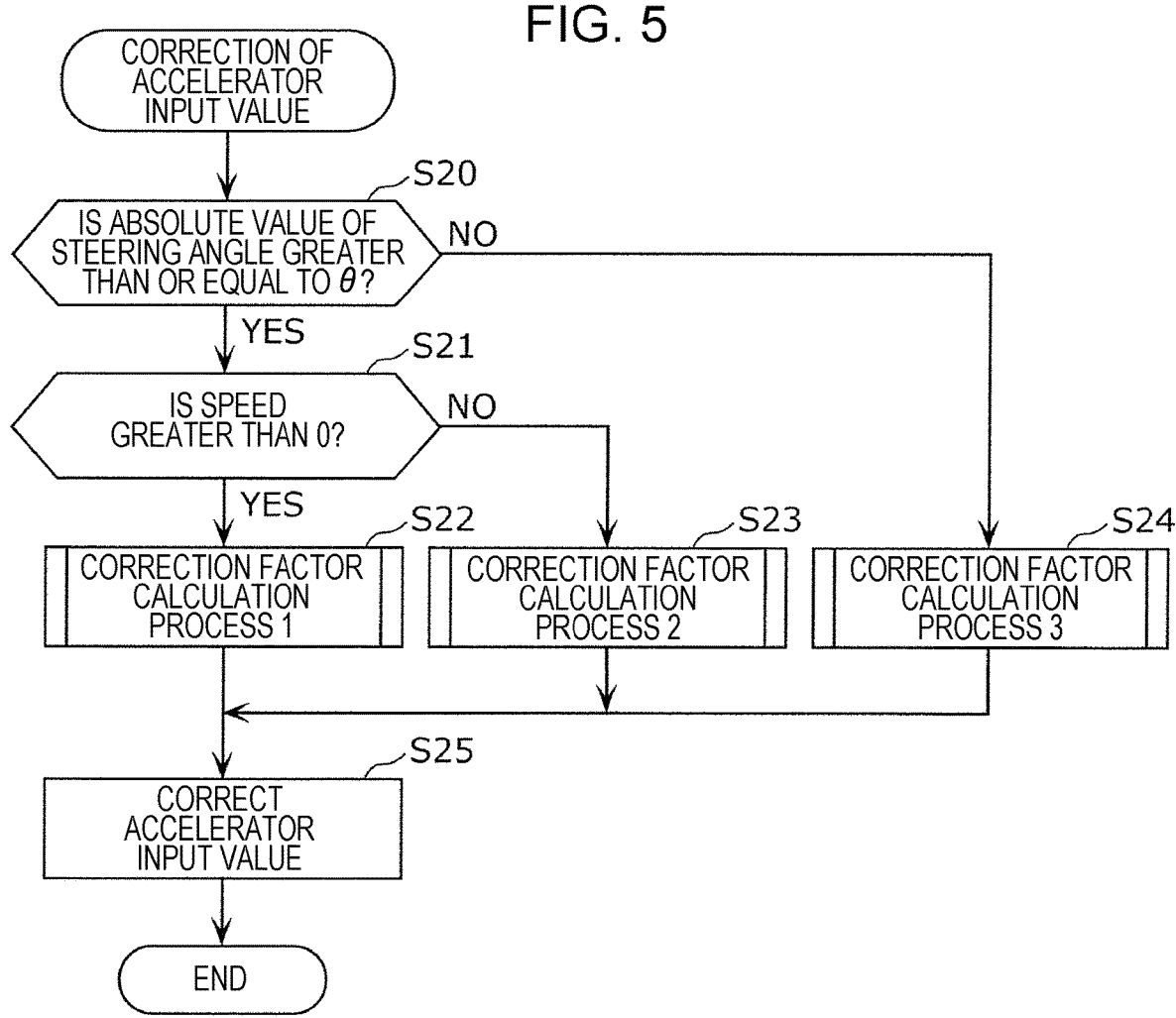
FIG. 5 is a flow chart illustrating an example of a correction process on an accelerator input value included in a vehicle operation signal.

FIG. 5 is a flow chart illustrating an example of a correction process on the accelerator input value included in the vehicle operation signal. More specifically, the flow chart in FIG. 5 illustrates an example of a correction process, performed in step S12 in FIG. 4, on the accelerator input value included in the vehicle operation signal.

In FIG. 5, in a case where the absolute value of the steering angle acquired in step S11 is greater than or equal to a steering angle threshold value θ (in a case where YES in S20), the remote control unit 1608 proceeds to step S21.

On the other hand, in a case where the absolute value of the steering angle acquired in step S11 is smaller than the steering angle threshold value θ (in a case where NO in S20), the remote control unit 1608 executes a correction factor calculation process 3 (S24). The correction factor calculation process 3 is executed by the remote control unit 1608, for example, when the vehicle 16 under control is moving straight.

In a case where the speed is greater than 0 (in a case where YES in S21), the remote control unit 1608 executes a correction factor calculation process 1(S22). The correction factor calculation process 1 is executed by the remote control unit 1608, for example, when the vehicle 16 under control is turning right or left. On the other hand, in a case where the speed is equal to 0 (in a case where NO in S21), the remote control unit 1608 executes a correction factor calculation process 2(S23). The correction factor calculation process 2 is executed by the remote control unit 1608, for example, when the steering wheel is turned and the vehicle 16 under control is started from a state in which the vehicle 16 under control is stopped.

The remote control unit 1608 then corrects the accelerator input value included in the vehicle operation signal based on a result of the process in one of steps S22 to S24 (S25).

Next, the correction factor calculation process in steps S22 to S24 is described below. First, a process of calculating a corrected accelerator input value from an accelerator input value included in a received vehicle operation signal is described. Formula 1 shows an example of a formula used in step S25 to correct the accelerator input value included in the vehicle operation signal. In formula 1, AC_IN denotes the accelerator input value included in the vehicle operation signal, and AC_OUT denotes a corrected accelerator input value. C denotes a correction factor, and C_MAX denotes a maximum value of the correction factor C. The correction factor C is a factor used, for example, to convert the received accelerator input value to a speed of the vehicle 16 under control. The correction factor C is a variable that is changed via processes described below with reference to FIG. 6 to FIG. 8. The maximum value C_MAX has a predetermined value. The maximum value C_MAX is a fixed value equal to, for example, "10", "100", or the like.

$$AC\_OUT = \frac{C}{C\_MAX} \times AC\_IN \quad (1)$$

For example, in a case where the correction factor C is equal to the maximum value C_MAX, the accelerator input value AC_IN is equal to the corrected accelerator input value AC_OUT as can be seen from formula 1. In a case where the correction factor C is smaller than the maximum value C_MAX, the corrected accelerator input value AC_OUT is smaller than the accelerator input value AC_IN. In this case, the speed of the vehicle 16 under control is smaller than a value at which the speed would be controlled by the accelerator input value AC_IN. The correction factor C is further described below with reference to FIG. 6 to FIG. 8.

Figure 6:
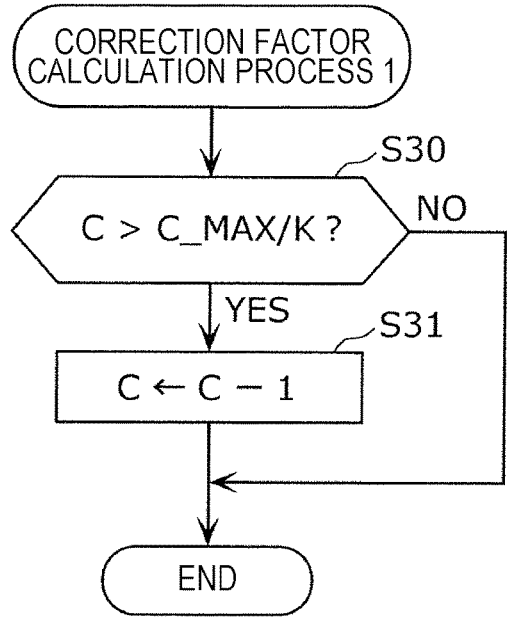
FIG. 6 is a flow chart illustrating an example of a correction factor calculation process 1.

FIG. 6 is a flow chart illustrating an example of the correction factor calculation process 1. When the operator 10 is performing an operation of turning the vehicle 16 under control right or left or a similar operation, the image on the information display unit 12 viewed by the operator 10 scrolls horizontally, which makes it difficult for the operator 10 to perceive a correct distance to an object on the image. Besides, as described above, because the operator 10 is not on the vehicle 16 under control, the operator 10 cannot get information which would be otherwise obtained via feeling on site. Therefore, when the operator 10 is performing an operation of turning the vehicle 16 under control right or left or a similar operation, it is difficult for the operator 10 to finely control the accelerator. For example, there is a possibility that the operator 10 presses the accelerator input part 11b too much and thus the vehicle 16 under control has an abrupt acceleration during the turning-right/left operation (see FIG. 14 and FIG. 15). To handle the above situation, in the correction factor calculation process 1 in step S22, the accelerator input value is corrected so as to reduce the probability of an occurrence of an abrupt acceleration on the vehicle 16 under control. More specifically, in the correction factor calculation process 1, a process is executed to reduce the correction factor C. Note that a limiting factor K is a factor that varies depending on the delay time described above. The limiting factor K is set, for example, such that when the delay time is equal to a minimum value or smaller than or equal to a particular value, the limiting factor K is set to "1", and the limiting factor K is increased as the delay time increases. The remote control unit 1608 may have a table stored therein which describes, for example, a correspondence between the delay time and the limiting factor K, whereby the limiting factor K may be set from the delay time using the table. However, in the following description of step S22, it is assumed by way of example that the limiting factor K is constant (that is, the delay time is constant).

As shown in FIG. 6, in a case where the correction factor C is greater than C_MAX/K (in a case where YES in S30), the remote control unit 1608 subtracts 1 from the correction factor C and employs a result as a new value of the correction factor C (S31). The execution of the correction factor calculation process 1 causes the correction factor C to be changed to a value smaller than the original uncorrected value. For example, the correction factor calculation process 1 is performed repeatedly until the correction factor C becomes equal to C_MAX/K. Hereinafter, the value used in the correction factor calculation processes 1 to 3 will also be referred as a reference value. In the present embodiment, a value given by C_MAX/K is the reference value. This holds also in the following description explained with reference to FIG. 7 and other figures.

In the process in step S31 described above, "1" is subtracted from the correction factor C. However, the value subtracted from the correction factor C is not limited to "1" as long as the corrected correction factor C obtained as a result of the correction factor calculation process 1 in step S31 is smaller than the original value of the correction factor C before being subjected to the correction factor calculation process 1. For example, in the correction factor calculation process 1 in step S31, the original value of the correction factor C may be multiplied by a value smaller than "1", thereby correcting the correction factor C.

On the other hand, in a case where the correction factor C is smaller than or equal to the reference value (in a case where NO in S30), the remote control unit 1608 ends the process without performing anything. That is, the original value, which the correction factor C has before the correction factor calculation process 1 is executed, is maintained.

As described above, after the correction factor calculation process 1 is executed, the correction factor C becomes smaller than or equal to the reference value. As a result, the accelerator input value AC_OUT obtained as a result of the correction according to formula 1 is smaller than the accelerator input value AC_IN. Thus, even in a case where the operator 10 presses the accelerator input part 11b too much, the vehicle 16 under control is prevented from being abruptly accelerated. That is, when the speed of the vehicle 16 under control changes abruptly, the change is slowed down. The process in step S22 is performed to limit the change in the speed of the vehicle 16 under control in a situation in which it is difficult for the operator 10 to finely control the operation on the accelerator. Thus, even in a case where the operator 10 presses the accelerator input part 11b too much during a turning-right/left operation, the vehicle 16 under control is turned right/left smoothly.

Figure 7:
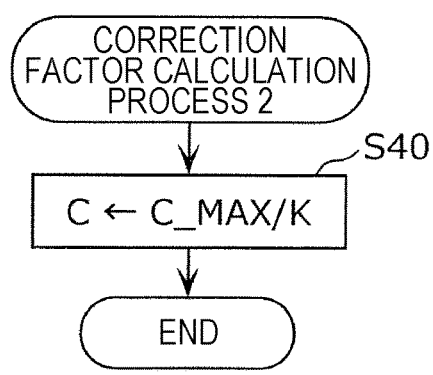
FIG. 7 is a flow chart illustrating an example of a correction factor calculation process 2.

FIG. 7 is a flow chart illustrating the correction factor calculation process 2. When the operator 10 starts the vehicle 16 under control from a state in which the vehicle 16 under control is stopped and turns the vehicle 16 under control to the right/left, the operator 10 operates the operation input unit 11 while watching an image displayed on the information display unit 12. When the delay time is large, there can be a possibility that the image displayed on the information display unit 12 does not represent an actual situation around the vehicle 16 under control. However, in the case where there is a large delay time, the operator 10 operates the operation input unit 11 based on the image displayed information display unit 12 (based on the image representing, for example, a situation which occurred a little while ago, but it is difficult for the operator 10 to take into account the delay during the operation. That is, when there is a large delay time, it may be difficult for the operator 10 to properly start the vehicle 16 under control. To handle the above situation, in the correction factor calculation process 2, a process is executed to correct the accelerator input value depending on the delay time such that it becomes possible to properly start the vehicle 16 under control even when the delay time is large.

As shown in FIG. 7, the remote control unit 1608 sets the correction factor C to be equal to the reference value (C_MAX/K) (S40). The limiting factor K is increased as the delay time increases, and thus the reference value decreases as the delay time increases. For example, when the delay time is large, the correction factor C is set to a value smaller than in a case where the delay time is small. On the other hand, the limiting factor decreases as the delay time decrease, and thus the reference value increases as the delay time decreases. For example, when the delay time is small, the correction factor C is set to a value greater than in a case where the delay time is large. That is, in the correction factor calculation process 2, when the vehicle 16 under control in the stopped state is started, the initial value of the correction factor C is set depending on the delay time. For example, in a case where the limiting factor K is equal to 2, the correction factor C is set to be equal to one-half the maximum value C_MAX.

After the vehicle 16 under control is started, the processes in step S22 and S24 are executed using the correction factor C set in step S23.

Figure 8:
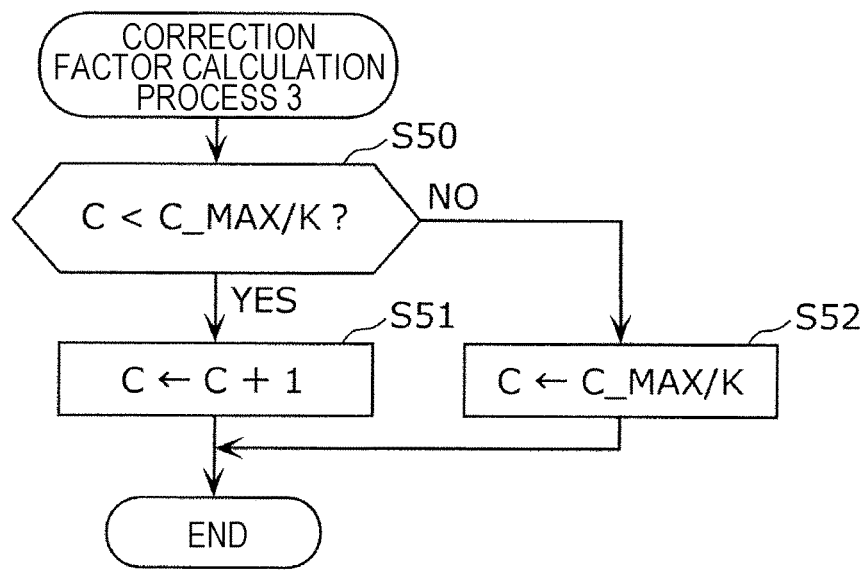
FIG. 8 is a flow chart illustrating an example of a correction factor calculation process 3.

FIG. 8 is a flow chart illustrating the correction factor calculation process 3. When the vehicle 16 under control is running straight, the operator 10 can perform the operation on the accelerator more finely than when the vehicle 16 under control is turning right/left. In view of the above, in the correction factor calculation process 3, a process is executed to make a correction such that the corrected value given as the accelerator input value AC_OUT becomes close to the accelerator input value AC_IN. That is, the process is performed such that the accelerator input value AC_IN is more directly reflected on the speed of the vehicle 16 under control. More specifically, in the correction factor calculation process 3, the process is performed such that the correction factor C is increased.

As shown in FIG. 8, in a case where the correction factor C is smaller than the reference value (C_MAX/K) (in a case where YES in S50), the remote control unit 1608 adds 1 to the correction factor C and employs a resultant value as a new value of the correction factor C (S51). In a case where the correction factor C is smaller than the correction factor C, the correction factor C is changed by executing the correction factor calculation process 3 such that the corrected value is greater than the original uncorrected value. For example, the correction factor calculation process 3 is performed repeatedly until the correction factor C becomes equal to the reference value. That is, the correction factor C increases such that the corrected value given as the accelerator input value AC_OUT becomes close to the accelerator input value AC_IN.

In the process in step S51 described above, "1" is added to the correction factor C. However, the value added to the correction factor C is not limited to "1" as long as the corrected correction factor C obtained as a result of the correction factor calculation process 3 in step S51 is greater than the original value that the correction factor C has before the correction factor calculation process 3 is executed. For example, in the correction factor calculation process 3 in step S51, the original value of the correction factor C may be multiplied by a value greater than "1", thereby correcting the correction factor C.

On the other hand, in a case where the correction factor C is greater than or equal to the reference value (in a case where NO in S50), the remote control unit 1608 sets the correction factor C to be equal to the reference value (S52). The process in step S52 may be performed in many ways as long as the correction factor C greater than or equal to the reference value is reduced. The process in step S52 may be performed such that 1 is subtracted from the correction factor C. The result of the determination in step S50 can be NO, for example, in a case where when the vehicle is running straight, the delay time increases and accordingly the limiting factor K increases.

As described above, the correction factor C obtained after the correction factor calculation process 3 is executed, the correction factor C becomes greater than or equal to the reference value. Thus, the corrected value given as the accelerator input value AC_OUT according to formula 1 becomes closer to the value of the accelerator input value AC_IN than in the case where correction factor calculation process 1 is executed, and thus, a result of an operation on the accelerator input part 11b by the operator 10 can be more directly reflected on the speed of the vehicle 16 under control. The process in step S24 is performed such that in a situation in which it is easy for the operator 10 perform a fine operation on the accelerator, the restriction on the change in the speed of the vehicle 16 under control is loosened. This makes it possible for the vehicle 16 under control to run at a speed close to a value intended by the operator 10.

As described above, according to the present embodiment, the vehicle 16 under control includes the remote control unit 1608 that corrects the accelerator input value such that in a case where the absolute value of the steering angle measured by the steering angle sensor 1602 is greater than or equal to the steering angle threshold value θ and the measured speed, which is a speed measured by the speed sensor 1603, is greater than 0 (YES in S20 and S21), the accelerator input value is corrected so as to reduce the speed of the vehicle 16 under control controlled by the accelerator input value to a value lower than in a case where the absolute value of the steering angle is smaller than the steering angle threshold value θ and the measured speed is greater than 0 (NO in S20).

Via the procedure described above, when the operator 10 controls the running of the vehicle 16 under control by operating the accelerator input part 11b while operating the steering input unit 11a, the remote control unit 1608 of the vehicle 16 under control corrects the accelerator input value included in the vehicle operation signal received from the remote operation apparatus 200, and inputs (outputs) the resultant corrected accelerator input value to the speed control unit 1604. Thus, in a situation in which the operator 10 performs operations simultaneously on both the steering input unit 11a and the accelerator input part 11b, even when an operation performed on the accelerator input part 11b is excessive, the vehicle 16 under control is turned while its speed is gradually increased without being abruptly accelerated. That is, it possible to realize a vehicle with improved operability and a method for controlling the vehicle.

Note that in the process of correcting the accelerator input value included in the vehicle operation signal in step S12 in FIG. 4, the remote control unit 1608 may calculate a delay time, associated with a network including the radio base station 15, between the remote operation apparatus 200 and the vehicle 16 under control, and the remote control unit 1608 may correct the accelerator input value included in the vehicle operation signal taking into account the calculated delay time. That is, the remote control unit 1608 may correct the accelerator input value further taking into account the delay time from the operation by the operator 10 to the reception of the vehicle operation signal by the wireless communication unit 1601.

More specifically, the remote control unit 1608 sets the limiting factor K to be variable from 1 to the maximum value C_MAX, inclusive, and increases the limiting factor K up to C_MAX depending on an increase in the delay time. When the condition for executing the correction factor calculation process 1 (S22) is satisfied, the correction factor C is substituted by a value smaller than a value that the correction factor C has before an occurrence of an increase in the delay. As a result, a reduction occurs in the corrected value given by the accelerator input value AC_OUT calculated according to formula 1. Therefore, the vehicle 16 under control is capable of quickly reducing the speed. That is, the remote control unit 1608 may correct the accelerator input value such that the speed of the vehicle 16 under control is quickly reduced as the delay time increases.

In a case where the limiting factor K has a large value and the condition for executing the correction factor calculation process 2 (S23) or the correction factor calculation process 3 (S24) is satisfied, the correction factor C is limited to smaller values than in a case where the limiting factor is smaller, which causes a reduction to occur in the corrected value given by the accelerator input value AC_OUT calculated according to formula 1. As a result, the vehicle 16 under control is capable of more slowly increasing the speed.

On the other hand, the remote control unit 1608 reduces the limiting factor K down to 1 depending on a reduction in the delay time. In this case, when the condition for executing the correction factor calculation process 1 (S22) is satisfied, the correction factor C is substituted by a greater value than in a case where the delay time is great, and thus an increase occurs in the corrected value given by the accelerator input value AC_OUT calculated according to formula 1. Therefore, the vehicle 16 under control is capable of slowly reducing the speed compared with a case where the delay time is large.

In a case where the limiting factor K has a small value and the condition for executing the correction factor calculation process 2 (S23) or the correction factor calculation process 3 (S24) is satisfied, the correction factor C is limited to greater values than in a case where the limiting factor is greater, which causes an increase to occur in the corrected value given by the accelerator input value AC_OUT calculated according to formula 1. As a result, the vehicle 16 under control is capable of more quickly increasing the speed.

It is difficult for the operator 10 to operate the operation input unit 11 depending on the delay time. When the reference value includes the limiting factor K and thus the reference value changes dynamically, the accelerator input value AC_IN is properly corrected depending on the delay time, and thus it is possible to realize a vehicle with further improved operability and a method for controlling the vehicle.

In an alternative example, depending on an increase or reduction in the delay time, the remote control unit 1608 may reduce or increase the steering angle threshold value θ based on which the determination is made in step S20 in FIG. 5 as to whether the steering angle is greater than or equal to the particular value. That is, the remote control unit 1608 may change the steering angle threshold value θ (an example of a particular angle) based on the delay time. More specifically, the remote control unit 1608 may change the steering angle threshold value θ based on a change in the delay time. An operation performed by the remote control unit 1608 to change the steering angle threshold value θ is described below with reference to FIG. 9.

Figure 9:
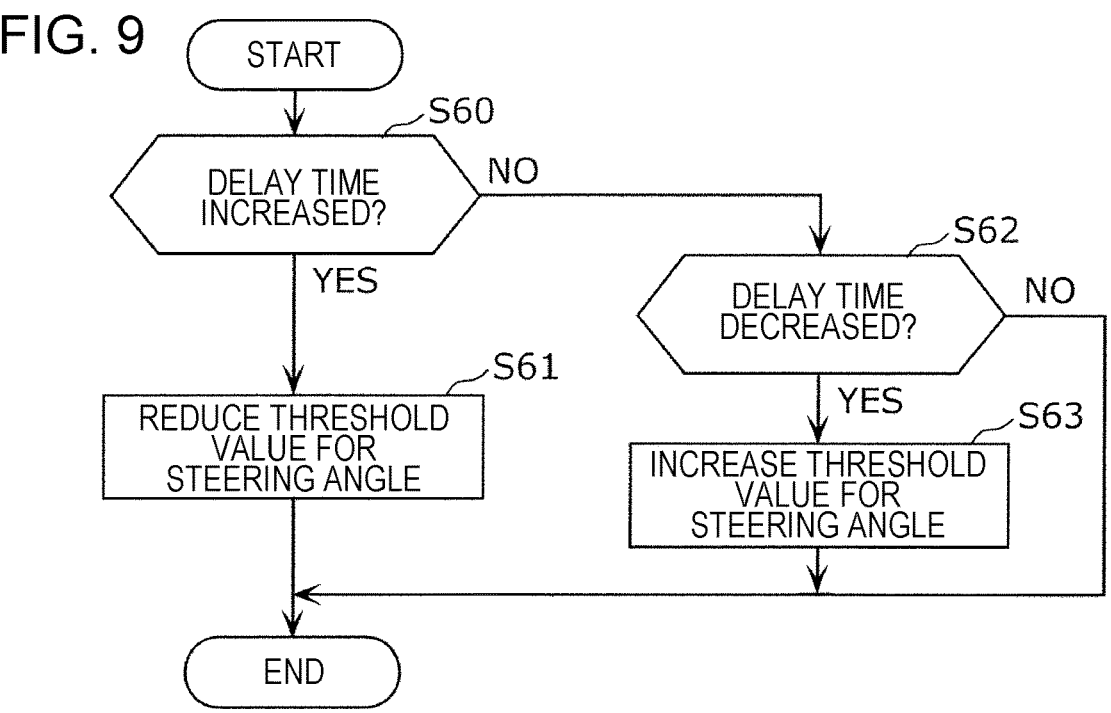
FIG. 9 is a flow chart illustrating an example of a process of changing a steering angle threshold value.

FIG. 9 is a flow chart illustrating an example of a process of changing the steering angle threshold value θ.

As shown in FIG. 9, the remote control unit 1608 determines whether an increase in the delay time has occurred (S60). For example, the remote control unit 1608 determines whether a delay time calculated from a current time and information included in the received vehicle operation signal and indicating a time at which the operation input unit 11 was operated by the operator 10 is greater than a delay time calculated from a vehicle operation signal acquired in a previous reception. In a case where it is determined that an increase in the delay time has occurred (YES in S60), the remote control unit 1608 reduces the steering angle threshold value θ (S61). That is, the remote control unit 1608 reduces the steering angle threshold value θ as the delay time increases. As a result, for example, when an increase in the delay time occurs, the processing flow proceeds to step S22 even when the steering angle is smaller in order to perform a process of limiting the change in the speed of the vehicle 16 under control. That is, in a case where an increase in the delay time occurs, the correction of the accelerator input value is performed for a range of the steering angle whose lower limit is reduced.

On the other hand, in a case where it is determined that no increase in the delay time has occurred (NO in S60), the remote control unit 1608 determines whether a reduction in the delay time has occurred (S62). In a case where it is determined that a reduction in the delay time has occurred (YES in S62), the remote control unit 1608 increases the steering angle threshold value θ (S63). On the other hand, in a case where it is determined that no reduction in the delay time has occurred (NO in S62), that is, in a case where no change in the delay time has occurred, the remote control unit 1608 ends the process without changing the steering angle threshold value θ. Note that in a case where a difference between a delay time calculated from a latest vehicle control signal and a delay time calculated from a previously acquired vehicle operation signal is greater than or equal to a particular value, the remote control unit 1608 may determine affirmatively in step S60 or S62.

Note that the manner of changing the steering angle threshold value θ is not limited to the example described above. For example, when the delay time becomes greater than a particular threshold value, the remote control unit 1608 may change the steering angle threshold value θ to a smaller value.

Note that in the determination in step S21 in FIG. 5, "acceleration" may be judged instead of the "speed".

Note that the delay time described above may further include one or more of the following delays: a delay due to encoding an input signal provided by the camera 1609 installed on the vehicle 16 under control; a delay from a time at which the remote operation apparatus 200 receives and encodes image information to a time at which a resultant image information is output to the information display unit 12; and a delay due to a process performed by the remote operation unit 13 to generate a vehicle operation signal based on a result of an operation on the operation input unit 11 by the operator 10.

In steps S22 to S24 (the correction factor calculation process 1 to the correction factor calculation process 3) described above, by way of example, the limiting factor K is used in the calculation of the reference value. However, the manner of calculating the reference value is not limited to the example described above. At least one of steps S22 to S24, the reference value may be calculated without using the limiting factor K. In the above description, it is assumed by way of example that the reference value is equal for all steps S22 to S24. However, the reference value is not limited to this example. The reference value may be different among the steps S22 to S24. For example, the reference value used in step S22 may be set to a value smaller than a value of the reference value used in step S24.

1-3. Advantageous Effects and Related Issues

As described above, in the present embodiment, the vehicle 16 under control remotely operated by the operator 10 includes the wireless communication unit 1601 (an example of a communication part) that receives, in response to an operation performed by the operator, the vehicle operation signal including the accelerator input value, the steering angle sensor 1602 that measures the steering angle of the vehicle 16 under control, the speed sensor 1603 that measures the speed of the vehicle 16 under control, and the remote control unit 1608 (an example of a controller) that corrects the accelerator input value such that in a case where the absolute value of the steering angle is greater than or equal to the particular angle and the speed is greater than 0, the accelerator input value is corrected so as to reduce the speed to a value smaller than when the absolute value of the steering angle is smaller than the particular angle and the speed is greater than 0.

Thus, in this vehicle 16 under control operated by the operator 10, even in a situation in which the operator 10 cannot directly feel the acceleration, the rotation, or the like of the vehicle 16 under control, the speed of the vehicle 16 under control is reduced to a value smaller than is directly controlled by the accelerator input value, and thus the vehicle 16 under control is prevented from being abruptly accelerated. Furthermore, it is possible to reduce a load related to the operation of the accelerator input part 11b and the brake input part 11c. That is, when the operator 10 remotely operates the vehicle 16 under control, the operator 10 is allowed to concentrate on the operation of the steering input unit 11a according to an image around the vehicle transmitted from the vehicle 16 under control. That is, it is possible to provide a vehicle with further improved operability.

Furthermore, the remote control unit 1608 corrects the accelerator input value taking into account also the delay time from the operation of the operator 10 to the reception of the vehicle operation signal by the wireless communication unit 1601.

This makes it possible for the remote control unit 1608 to adjust the speed of the vehicle 16 under control to a value depending on an increase/decrease in the delay time. Therefore, even when a temporary increase in the delay time occurs, the operator 10 is allowed to operate the vehicle 16 under control without being conscious of the increase in the delay time. Thus, it is possible to provide a vehicle 16 under control with a further improved operability.

Furthermore, in a case where the absolute value of the steering angle is greater than or equal to a steering angle threshold value θ and the speed is greater than 0, the remote control unit 1608 corrects the accelerator input value such that the speed of the vehicle 16 under control is quickly reduced as the delay time increases.

Therefore, even in a situation in which it is difficult for the operator 10 to operate the vehicle 16 under control taking into account the delay time, the remote control unit 1608 is capable of adjusting the speed of the vehicle 16 under control such that the speed decreases as the delay time increases. Thus, it is possible to provide a vehicle 16 under control with a further improved operability.

Furthermore, the remote control unit 1608 changes the steering angle threshold value θ based on a change in the delay time.

This makes it possible for the remote control unit 1608 to control the speed of the vehicle 16 under control based on the steering angle threshold value θ depending on an increase/decrease in the delay time. Therefore, even when a temporary increase in the delay time occurs, the operator 10 is allowed to operate the vehicle 16 under control without being conscious of the increase in the delay time. Thus, it is possible to provide a vehicle 16 under control with a further improved operability.

Furthermore, the remote control unit 1608 reduces the steering angle threshold value θ as the delay time increases.

This makes it possible for the remote control unit 1608 limit the speed of the vehicle 16 under control for a range of the steering angle whose lower limit is reduced as the delay time increases. Thus, it is possible to provide a vehicle 16 under control with further improved operability.

As described above, according to the present embodiment, the vehicle control method for controlling the vehicle 16 under control remotely operated by the operator 10 includes receiving, in response to an operation performed by the operator 10, a vehicle operation signal including an accelerator input value (S10), and correcting the accelerator input value such that in a case where the absolute value of the steering angle of the vehicle 16 under control is greater than or equal to the particular angle and the speed of the vehicle 16 under control is greater than 0, the accelerator input value is corrected so as to reduce the speed to a value smaller than when the absolute value of the steering angle is smaller than the particular angle and the speed is greater than 0 (S12).

This provides advantageous effects similar to those provided by the vehicle 16 under control described above.

Second Embodiment

Next, a second embodiment is described below. In the first embodiment, the vehicle under control 16 corrects the accelerator input value included in the vehicle operation signal generated by the remote operation apparatus 200 and received by the vehicle under control 16. The second embodiment is different in that an accelerator input value is corrected by the remote operation apparatus 200 based on vehicle information associated with the vehicle 16 under control, and then a vehicle operation signal is generated.

The second embodiment is described below while focusing on differences from the first embodiment.

A remote operation system according to the second embodiment is the same as the remote operation system 1000 according to the first embodiment, and thus a description thereof is omitted.

2-1-1. Configuration of Vehicle Under Control

A detailed configuration associated with the remote operation of the vehicle 16 under control according to the second embodiment is basically similar to that of the vehicle 16 under control according to the first embodiment. A description is given below focusing on differences from the first embodiment.

The remote control unit 1608 acquires the steering angle output from the steering angle sensor 1602 and the speed output from the speed sensor 1603, and transmits them as vehicle information to the remote operation apparatus 200 via the wireless communication unit 1601.

In the first embodiment, the remote control unit 1608 corrects the accelerator input value included in the vehicle operation signal received from the remote operation apparatus 200. In the second embodiment, the remote control unit 1608 does not perform the correction on the accelerator input value included in the vehicle operation signal received from the remote operation apparatus 200.

2-1-2. Configuration of Remote Operation Unit of Remote Operation Apparatus

Figure 10:
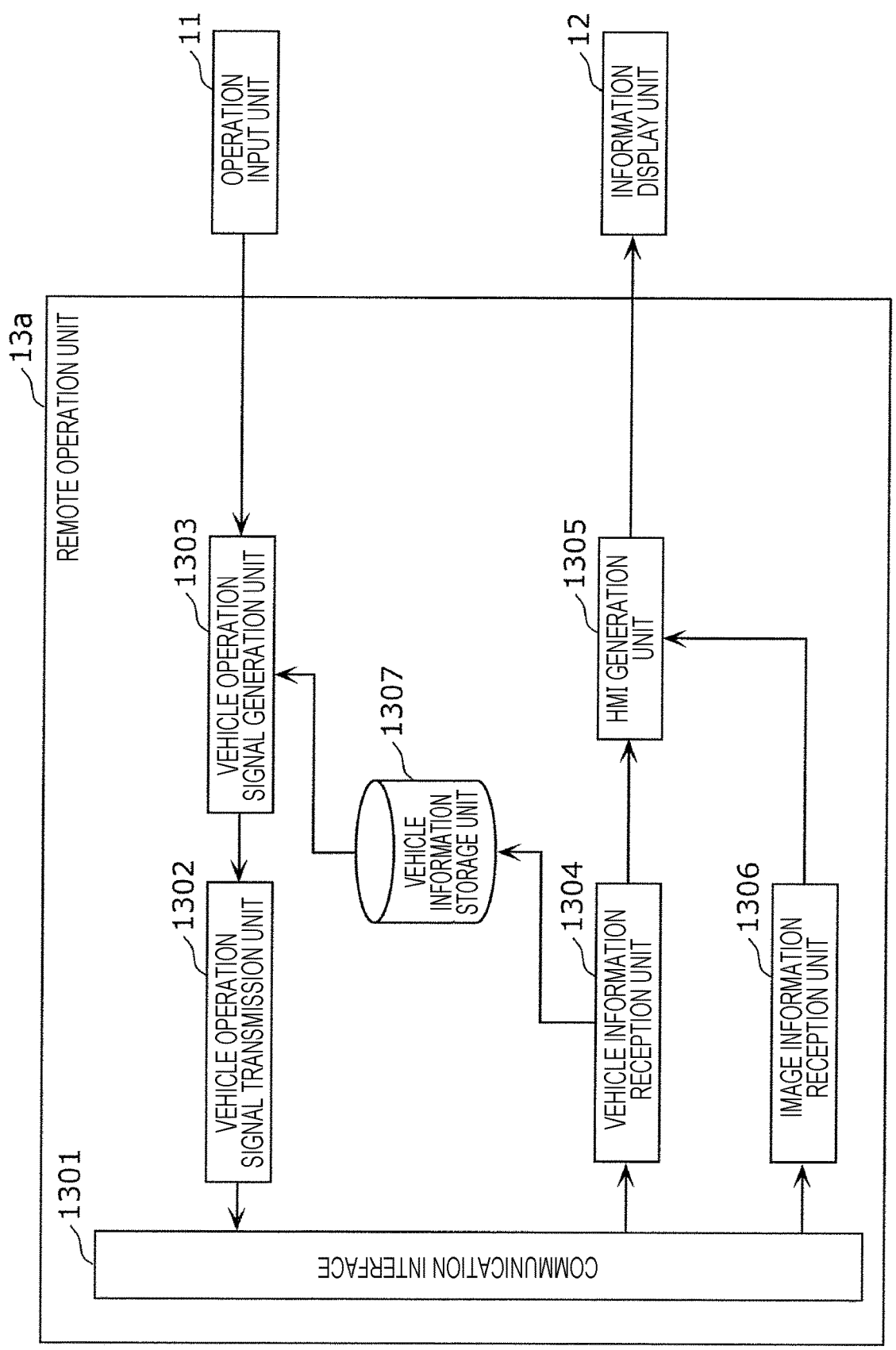
FIG. 10 is a block diagram illustrating an example of a configuration of a remote operation unit in a remote operation system according to a second embodiment.

FIG. 10 is a diagram illustrating an example of a configuration of a remote operation unit 13*a* in the remote operation system according to the present embodiment. The configuration is described below while focusing on differences from the first embodiment. In FIG. 10, the remote operation unit 13*a* includes a vehicle information storage unit 1307 in addition to the elements included in the remote operation unit 13 according to the first embodiment.

The vehicle information reception unit 1304 receives at least vehicle information transmitted by the vehicle 16 under control via the communication interface 1301. The vehicle information reception unit 1304 is an example of a communication part that receives vehicle information including information indicating the speed of the vehicle 16 under control.

The vehicle information reception unit 1304 outputs the received vehicle information to the HMI generation unit 1305 and stores the received vehicle information in the vehicle information storage unit 1307.

The vehicle information storage unit 1307 stores the vehicle information received by the vehicle information reception unit 1304. The vehicle information storage unit 1307 is a storage apparatus such as a semiconductor memory or the like.

The vehicle operation signal generation unit 1303 generates a vehicle operation signal based on an operation performed on the operation input unit 11 by the operator 10.

The vehicle operation signal generation unit 1303 makes a correction, based on the vehicle information associated with the vehicle 16 under control stored in the vehicle information storage unit 1307, on an accelerator input value which is a signal generated as a result of operating the accelerator input part 11*b* of the operation input unit 11 by the operator 10 and which is included in the vehicle operation signal to be transmitted to the vehicle 16 under control. That is, the vehicle operation signal generation unit 1303 makes the correction, based on the vehicle information associated with the vehicle 16 under control stored in the vehicle information storage unit 1307, on the accelerator input value which is the signal generated as a result of operating the accelerator input part 11*b* of the operation input unit 11 by the operator 10 thereby generating the vehicle operation signal. Note that the vehicle information associated with the vehicle 16 under control is information including the steering angle of the vehicle 16 under control acquired from the steering angle sensor 1602 and the speed of the vehicle 16 under control acquired from the speed sensor 1603. The vehicle operation signal generation unit 1303 is a controller included in the remote operation apparatus 200 and is an example of a controller that corrects the accelerator input value.

Thus, in the vehicle 16 under control operated by the operator 10, configured in the above-described manner, even in a situation in which the operator 10 cannot directly feel the acceleration, the rotation, or the like of the vehicle 16 under control, the accelerator input value which is the signal generated as a result of operating the accelerator input part 11*b* by the operator 10 is corrected based on the vehicle information associated with the vehicle 16 under control. Thus, it is possible to realize a remote operation apparatus 200 with improved operability.

2-2. Operation in Remote Operation Unit

Figure 11:
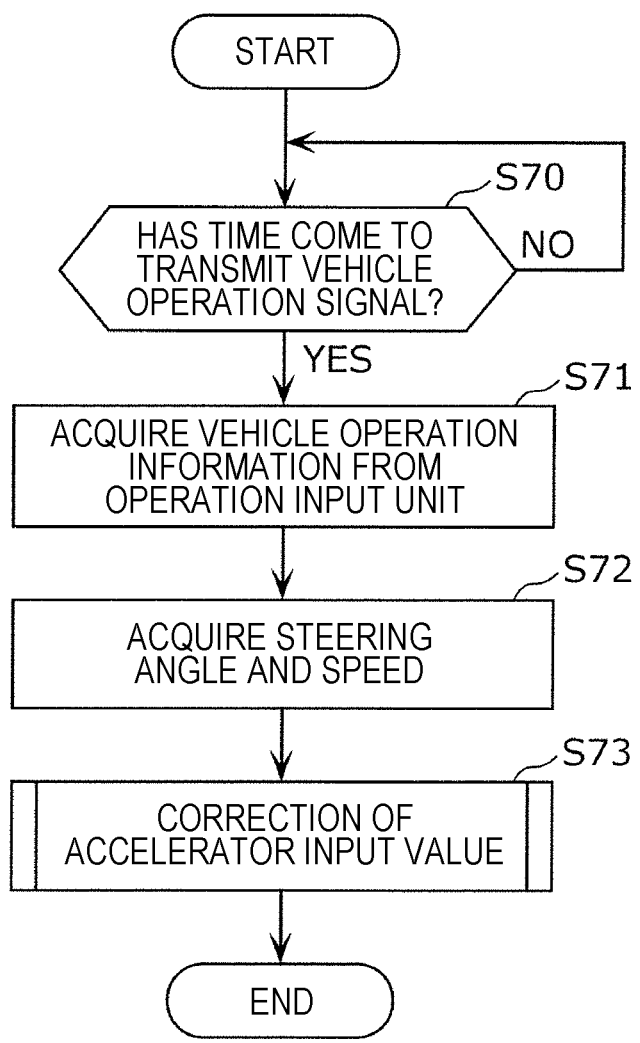
FIG. 11 is a flow chart illustrating an example of a process performed by a vehicle operation signal generation unit to generate an accelerator input value included in a vehicle operation signal to be transmitted to a vehicle under control according to the second embodiment.

FIG. 11 is a flow chart illustrating an example of a process of generating the accelerator input value included in the vehicle operation signal to be transmitted to the vehicle 16 under control, in the vehicle operation signal generation unit 1303 according to the present embodiment.

The vehicle operation signal generation unit 1303 performs the process described in the flow chart in FIG. 11 repeatedly as long as the remote operation the operator 10 continues.

In a case where a transmission time to transmit the vehicle operation signal has come (YES in S70), the vehicle operation signal generation unit 1303 acquires vehicle operation information from the operation input unit 11 (S71). More specifically, the vehicle operation signal generation unit 1303 acquires a steering input value, an accelerator input value, and a brake input value respectively from the steering input unit 11a that controls steering of the vehicle 16 under control, the accelerator input part 11b that controls the rotation speed of the engine or the more of the vehicle 16 under control, and the brake input part 11c that controls the brake of the vehicle 16 under control. The steering input value, the accelerator input value, and the brake input value are each an example of vehicle operation information. Note that step S71 is an example of a step of acquiring the steering input value and a step of acquiring the accelerator input value.

On the other hand, in a case where the transmission time to transmit the vehicle operation signal has not yet come (NO in S70), the vehicle operation signal generation unit 1303 returns to step S70. The transmission time may be defined by a particular time or by a particular elapsed time from a previous transmission of the vehicle operation signal.

Next, the vehicle operation signal generation unit 1303 acquires the steering angle and the speed of the vehicle 16 under control from the received vehicle information (S72). More specifically, the vehicle operation signal generation unit 1303 acquires the latest steering angle and speed of the vehicle 16 under control from the vehicle information storage unit 1307. Note that step S72 is an example of a step of receiving the speed of the vehicle 16 under control.

Note that the steering angle of the vehicle 16 under control may be given by the steering input value acquired in step S71.

Next, the vehicle operation signal generation unit 1303 performs a process of correcting the accelerator input value acquired in step S71 based on the steering angle and the speed acquired in step S72 (S73). Thereafter, the vehicle operation signal including the corrected accelerator input value is transmitted to the vehicle 16 under control via the communication interface 1301. Note that step S73 is an example of a step of correcting the accelerator input value.

Figure 12:
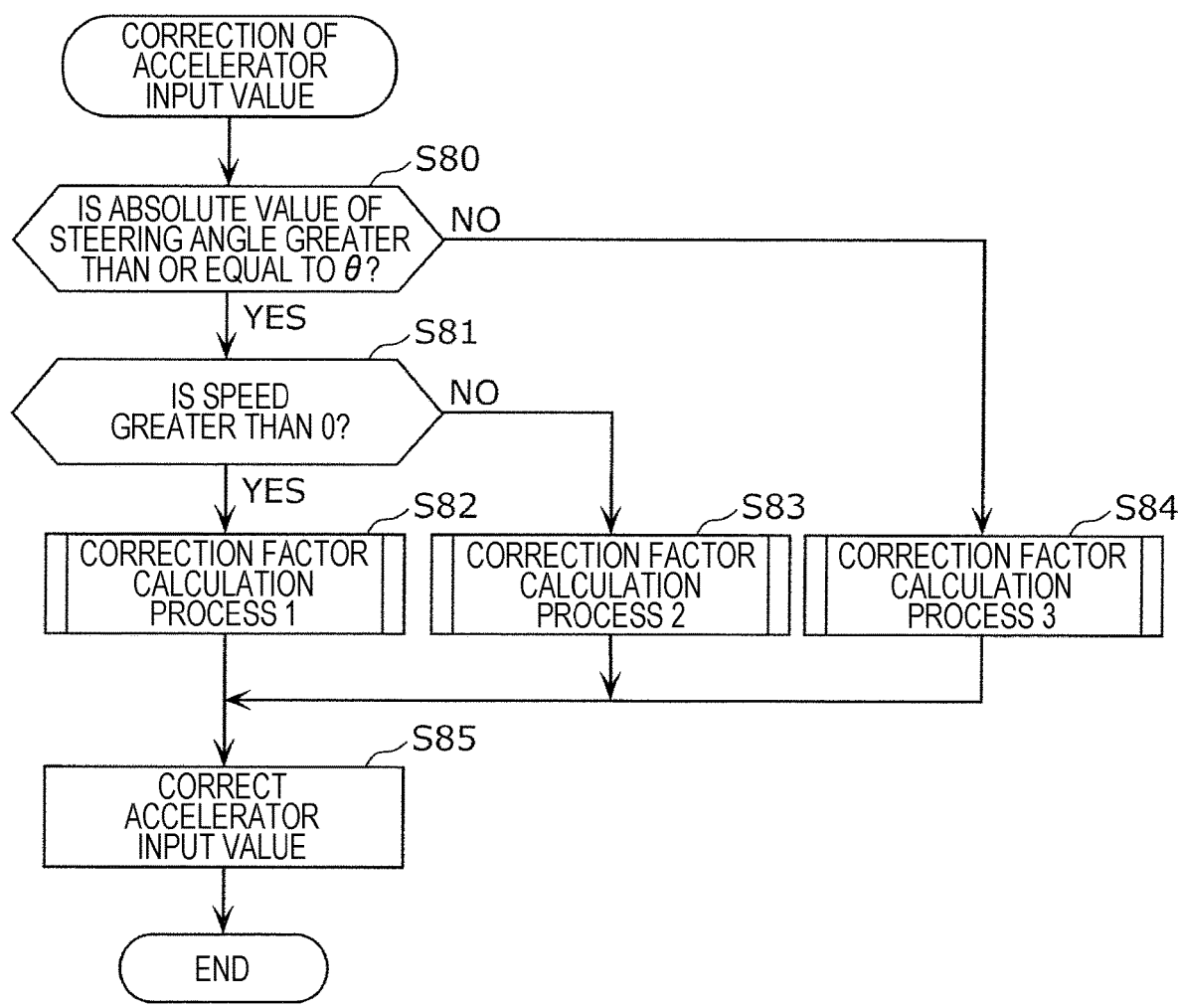
FIG. 12 is a flow chart illustrating an example of a process of correcting an accelerator input value included in a vehicle operation signal.

FIG. 12 is a flow chart illustrating an example of a process of correcting the accelerator input value included in the vehicle operation signal. More specifically, the flow chart in FIG. 12 illustrates an example of a process in step S73 in FIG. 11 to correct the accelerator input value acquired in step S71.

In FIG. 12, in a case where the absolute value of the steering angle acquired in step S72 is greater than or equal to the steering angle threshold value θ (YES in S80), the vehicle operation signal generation unit 1303 proceeds to step S81.

On the other hand, in a case where the absolute value of the steering angle acquired in step S72 is smaller than the steering angle threshold value θ (NO in S80), the vehicle operation signal generation unit 1303 executes the correction factor calculation process 3 (S84).

In a case where the speed is greater than 0 (YES in S81), the vehicle operation signal generation unit 1303 then executes the correction factor calculation process 1 (S82). On the other hand, in a case where the speed is equal to 0 (NO in S81), the vehicle operation signal generation unit 1303 executes the correction factor calculation process 2 (S83).

Next, the vehicle operation signal generation unit 1303 corrects the accelerator input value acquired from the operation input unit 11 based on a result of one of processes in steps S82 to S84 (S85).

Note that the correction factor calculation process 1 in step S82, the correction factor calculation process 2 in step S83, the correction factor calculation process 3 in step S84, and the correction of the accelerator input value in step S85 are respectively similar to the processes in steps S22, S23, S24, and S25 according to the first embodiment.

As described above, in the present embodiment, the remote operation unit 13a of the remote operation apparatus 200 includes the vehicle operation signal generation unit 1303 configured such that when the absolute value of the steering angle of the vehicle 16 under control is greater than or equal to the steering angle threshold value θ and the speed of the vehicle 16 under control is greater than 0 (YES in S80 and S81), the accelerator input value is corrected so as to reduce the speed of the vehicle 16 under control controlled by the accelerator input value to a value lower than in a case where the absolute value of the steering angle is smaller than the steering angle threshold value θ and the speed of the vehicle 16 under control is greater than 0 (NO in S80). Note that the steering angle of the vehicle 16 under control may be the steering angle included in the vehicle information received from the vehicle 16 under control or may be the steering angle controlled by the steering input value acquired from the operation input unit 11.

By the above-described remote operation apparatus 200 and the vehicle remote operation method for the remote operation apparatus 200, the accelerator input value, which is a signal generated as a result of operating the accelerator input part 11b by the operator 10, is corrected based on the vehicle information associated with the vehicle 16 under control. That is, it is possible to realize the remote operation apparatus 200 with improved operability and the vehicle remote operation method.

Note that in the process in step S73 in FIG. 11 to correct the accelerator input value acquires in step S71, the vehicle operation signal generation unit 1303 may take into account the delay time between the remote operation apparatus 200 and the vehicle 16 under control in the correction of the accelerator input value acquired in step S71. For example, the vehicle operation signal generation unit 1303 may increase or decrease the limiting factor K in FIG. 6 or FIG. 7 depending on an increase or decrease in the delay time. In this case, when an increase in the delay time occurs, the limiting factor K is increased, and thus the correction factor C is reduced. As a result, the accelerator input value acquired in step S71 is corrected to a smaller value. Therefore, the vehicle 16 under control is capable of more slowly increasing the speed.

In an alternative example, the vehicle operation signal generation unit 1303 may increase or reduce the steering angle threshold value θ in step S80 in FIG. 12 depending on an increase or decrease in the delay time. The vehicle operation signal generation unit 1303 may perform, for example, the process shown in FIG. 9. Thus, when an increase in the delay time occurs, the correction of the accelerator input value is performed for a range of the steering angle whose lower limit is reduced.

The delay time described above may further include one of the following: a delay due to encoding an input signal provided by the camera 1609 installed on the vehicle 16 under control; a delay due to a process of receiving, at the remote operation apparatus 200, the encoded image information via the radio base station 15 and the network 14; a delay due to a process performed by the remote operation unit 13 to decode the received image information and output the decoded image information to the information display unit 12; a delay due to a process performed by the remote operation unit 13 to generate a vehicle operation signal based on a result of an operation on the operation input unit 11 by the operator 10; and a delay due to transmission of the vehicle operation signal to the vehicle 16 under control via the network 14 and the radio base station 15.

2-3. Advantageous Effects and Related Issues

As described above, according to the present embodiment, the vehicle remote operation apparatus 200, which remotely operates the vehicle 16 under control by the operator 10, includes the accelerator input part 11b that outputs then accelerator input value in accordance with the operation performed by the operator 10 to control the speed of the vehicle 16 under control, the communication part that receives the speed of the vehicle 16 under control, and the vehicle operation signal generation unit 1303 (an example of a controller) that corrects the accelerator input value such that in a case where the absolute value of the steering angle of the vehicle 16 under control is greater than or equal to the steering angle threshold value θ (an example of a particular angle) and the speed is greater than 0, the accelerator input value is corrected so as to reduce the speed to a value smaller than when the absolute value of the steering angle is smaller than the steering angle threshold value θ and the speed is greater than 0.

By employing the above-described configuration, even in a situation in which the operator 10, who remotely operates the vehicle 16 under control, cannot directly feel the acceleration or the rotation of the vehicle 16 under control, the accelerator input value which is a signal generated as a result of operating the accelerator input part 11b by the operator 10 is corrected based on the vehicle information associated with the vehicle 16 under control. Thus, it is possible to realize the remote operation apparatus 200 with improved operability.

As described above, according to the present embodiment, the vehicle remote operation method for remotely operating the vehicle 16 under control the operator 10, includes the steps of outputting an accelerator input value, which controls the speed of the vehicle 16 under control, in accordance with an operation performed by the operator 10, receiving the speed of the vehicle 16 under control, and correcting the accelerator input value such that in a case where the absolute value of the steering angle of the vehicle 16 under control is greater than or equal to the steering angle threshold value θ and the speed is greater than 0, the accelerator input value is corrected so as to reduce the speed to a value smaller than when the absolute value of the steering angle is smaller than the steering angle threshold value θ and the speed is greater than 0.

Thus advantageous effects similar to those provided by the remote operation apparatus 200 are achieved.

Other Embodiments

The present disclosure has been described above with reference to the vehicle under control and related techniques according to the embodiments. However, the present disclosure is not limited to those embodiments.

Note that constituent elements shown in the accompanying drawings or in the detailed descriptions may include not only a constituent element that is needed to practice the present disclosure but a constituent element that is not necessarily needed and is provided only for illustration. That is, it should be understood that showing a constituent element in an accompanying drawing or a detailed description does not necessarily mean that this constituent element is indispensable.

It will be apparent to those skilled in the art that many various modifications may be applicable to the embodiments without departing from the spirit and scope of the present disclosure. Furthermore, constituent elements of different embodiments may be combined. Any resultant combination also falls within the scope of the present disclosure.

In the embodiments described above, it is assumed by way of example but not limitation that the correction factor calculation process 1 is executed or not executed depending on whether the speed of the vehicle under control is greater than 0. Alternatively, for example, when the speed of the vehicle under control is greater than a particular speed, the correction factor calculation process 1 may be executed. More specifically, for example, when the speed of the vehicle under control is greater than 5 km/h, the correction factor calculation process 1 may be executed.

In the embodiments described above, each constituent element may be realized using dedicated hardware or may be realized by executing software program corresponding to the constituent element. Each constituent element may be realized by a program execution unit such as a processor or the like by reading software program stored in a storage medium such a hard disk, a semiconductor memory, or the like and executing the software program. The processor includes one or more electronic circuits including a semiconductor integrated circuit (IC) or an LSI (Large scale integration). The plurality of electronic circuits may be integrated on a single chip or may be realized by a plurality of chips. The plurality of chips may be disposed in a single apparatus, or may be distributed among a plurality of apparatuses.

Note that the order of executing a plurality of processes described above is merely an example. The order of executing the plurality of processes may be changed. Furthermore, the plurality of processes may be executed in parallel.

The remote operation system according to the present disclosure is effective in a system in which a vehicle running on a roadway is steered by an operator from a remote location via a communication line or the like.

What is claimed is:

1. A vehicle that is remotely operable by an operator, comprising:
a communication circuit that receives a vehicle operation signal including an accelerator input value input based on a first operation performed by the operator;
a steering angle sensor that measures a steering angle of the vehicle;
a speed sensor that measures a speed of the vehicle; and
a processor that, during vehicle operation, performs processing operations including:
when an absolute value of an angular measure of the steering angle is greater than or equal to a predetermined threshold angular measure and the speed is greater than zero, correcting the accelerator input value so as to reduce the speed to a value that is less than when the absolute value of the angular measure of the steering angle is less than the predetermined threshold angular measure and the speed is greater than zero.

2. The vehicle according to claim 1, wherein
in the correcting,
the accelerator input value is corrected based on a delay time from a time that the first operation is performed by the operator to a time of the reception of the vehicle operation signal by the communication circuit.

3. The vehicle according to claim 2, wherein
in the correcting,
the accelerator input value is corrected such that when the absolute value of the angular measure of the steering angle is greater than or equal to the predetermined threshold angular measure and the speed is greater than zero, the accelerator input value is corrected so as to increase a rate at which the speed is reduced as the delay time increases.

4. The vehicle according to claim 2, wherein
the processing operations further include
changing the predetermined threshold angular measure based on a change in the delay time.

5. The vehicle according to claim 4, wherein
the processing operations further include
reducing the predetermined threshold angular measure as the delay time increases.

6. The vehicle according to claim 1, wherein
the processing operations further include
determining whether to correct at least one from among the accelerator input value and the predetermined threshold angular measure based on a delay time from a time that the first operation is performed by the operator to a time of the reception of the vehicle operation signal by the communication circuit.

7. The vehicle according to claim 1, wherein the communication circuit periodically receives an updated vehicle operation signal based on an elapsement of a predetermined fixed time interval following a previous reception of the vehicle operation signal.

8. A vehicle control method for controlling a vehicle that is remotely operable by an operator, comprising:
receiving a vehicle operation signal including an accelerator input value input based on a first operation performed by the operator; and
when an absolute value of an angular measure of a steering angle of the vehicle is greater than or equal to a predetermined threshold angular measure and a speed of the vehicle is greater than zero, correcting the accelerator input value such that the speed is reduced to a value that is less than when the absolute value of the angular measure of the steering angle is less than the predetermined threshold angular measure and the speed is greater than zero.

9. A vehicle remote operation apparatus that is usable by an operator to remotely operate a vehicle, comprising:
an accelerator controller that outputs an accelerator input value for controlling a speed of the vehicle based on a first operation performed by the operator;
a communication circuit that receives a signal that includes information relating to the speed of the vehicle; and
a processor that, during vehicle operation, performs processing operations including:
when an absolute value of an angular measure of a steering angle of the vehicle is greater than or equal to a predetermined threshold angular measure and the speed is greater than zero, correcting the accelerator input value so as to reduce the speed to a value that is less than when the absolute value of the angular measure of the steering angle is less than the predetermined threshold angular measure and the speed is greater than zero.

10. A vehicle remote operation method for remotely operating a vehicle by an operator, comprising:
acquiring an accelerator input value, which relates to controlling a speed of the vehicle, based on a first operation performed by the operator;
receiving information that relates to the speed of the vehicle; and
when an absolute value of an angular measure of a steering angle of the vehicle is greater than or equal to a predetermined threshold angular measure and the speed is greater than zero, correcting the accelerator input value so as to reduce the speed to a value that is less than when the absolute value of the angular measure of the steering angle is less than the a predetermined threshold angular measure and the speed is greater than zero.

* * * * *